US012694680B2

(12) United States Patent
Zheng et al.

(10) Patent No.: US 12,694,680 B2
(45) Date of Patent: Jul. 28, 2026

(54) METHODS, SYSTEMS, AND COMPUTER-READABLE STORAGE MEDIUMS FOR DETECTING A STATE OF A SIGNAL LIGHT

(71) Applicant: ZHEJIANG DAHUA TECHNOLOGY CO., LTD., Hangzhou (CN)

(72) Inventors: Shaolong Zheng, Hangzhou (CN); Tingniao Wang, Hangzhou (CN); Xiaomu Liu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 297 days.

(21) Appl. No.: 18/452,532

(22) Filed: Aug. 19, 2023

(65) Prior Publication Data

US 2023/0394829 A1     Dec. 7, 2023

Related U.S. Application Data

(63) Continuation of application No. PCT/CN2022/108821, filed on Jul. 29, 2022.

(30) Foreign Application Priority Data

Aug. 16, 2021     (CN) .......................... 202110939496.9

(51) Int. Cl.
*G06V 20/50*          (2022.01)
*G06T 7/60*           (2017.01)
(Continued)

(52) U.S. Cl.
CPC ............... *G06V 20/50* (2022.01); *G06T 7/60* (2013.01); *G06T 7/74* (2017.01); *G06T 7/90* (2017.01);
(Continued)

(58) Field of Classification Search
None
See application file for complete search history.

(56) References Cited

U.S. PATENT DOCUMENTS

2013/0253754 A1     9/2013  Ferguson et al.
2019/0278273 A1*    9/2019  Behrendt ........ B60W 30/18154
(Continued)

FOREIGN PATENT DOCUMENTS

CN          103324957 B      9/2013
CN          105160924 A      12/2015
(Continued)

OTHER PUBLICATIONS

Manato Hirabayashi et al, Traffic Light Recognition Using High Definition Map Features, Robotics and AutonomousSystems, 111:62-72 (Year: 2019).*
(Continued)

*Primary Examiner* — Vu Le
*Assistant Examiner* — Zaid Muhammad Saleh
(74) *Attorney, Agent, or Firm* — Metis IP LLC

(57) ABSTRACT

Some embodiments of the present disclosure provide methods, devices, computer-readable storage mediums for detecting a signal light. The method may include obtaining a first image and a second image previous to the first image in time sequence, wherein both the first image and the second image include a same target signal light; determining, based on the first image, a first state of the target signal light in the first image; determining, based on the second image and the first image, a second state of the target signal light in the first image; and determining, based on the first state and the second state, a target state of the target signal light at a time point when the first image is captured.

18 Claims, 11 Drawing Sheets

(51) Int. Cl.

| | |
|---|---|
| *G06T 7/73* | (2017.01) |
| *G06T 7/90* | (2017.01) |
| *G06V 10/25* | (2022.01) |
| *G06V 10/762* | (2022.01) |

(52) U.S. Cl.

CPC ............ *G06V 10/25* (2022.01); *G06V 10/762* (2022.01); *G06T 2207/10016* (2013.01); *G06T 2207/10024* (2013.01); *G06T 2207/20081* (2013.01); *G06T 2207/20084* (2013.01)

(56) References Cited

U.S. PATENT DOCUMENTS

| | | | | |
|---|---|---|---|---|
| 2020/0082186 | A1 | 3/2020 | Li et al. | |
| 2020/0135030 | A1* | 4/2020 | Krivokon | G08G 1/167 |
| 2021/0043073 | A1 | 2/2021 | Lim | |
| 2021/0312198 | A1* | 10/2021 | Hashimoto | G06V 10/82 |
| 2021/0334559 | A1 | 10/2021 | Liu | |

FOREIGN PATENT DOCUMENTS

| | | | | |
|---|---|---|---|---|
| CN | 106650641 | A | 5/2017 | |
| CN | 107527511 | A | 12/2017 | |
| CN | 109657622 | A | 4/2019 | |
| CN | 110532903 | A * | 12/2019 | G06N 3/045 |
| CN | 110619307 | A * | 12/2019 | G06V 20/584 |
| CN | 111210410 | A | 5/2020 | |
| CN | 111582030 | A | 8/2020 | |
| CN | 111815959 | A | 10/2020 | |
| CN | 112288031 | A | 1/2021 | |
| CN | 112989891 | A | 6/2021 | |
| JP | 2011170539 | A | 9/2011 | |
| JP | 2015153312 | A * | 8/2015 | |
| KR | 20210089588 | A | 7/2021 | |
| WO | 2021018144 | A1 | 2/2021 | |
| WO | 2021114031 | A1 | 6/2021 | |
| WO | 2023020251 | A1 | 2/2023 | |

OTHER PUBLICATIONS

International Search Report in PCT/CN2022/108821 mailed on Sep. 28, 2022, 5 pages.

Written Opinion in PCT/CN2022/108821 mailed on Sep. 28, 2022, 5 pages.

The Extended European Search Report in European Application No. 22857563.5 mailed on Mar. 7, 2024, 11 pages.

Manato Hirabayashi et al., Traffic Light Recognition Using High-Definition Map Features, Robotics and Autonomous Systems, 111: 62-72, 2019.

Wang, Siyu et al., A Real-time Detection Method of Traffic Targets Based on YOLO, Computer & Digital Engineering, 48(9): 2162-2167, 2020.

Li, Hao et al., Foreground Objects in Surveillance Video of Urban Traffic Intersection Using Feedback Background Subtraction Model, Journal of Transportation Systems Engineering and Information Technology, 17(6): 63-69, 2017.

Sun, Yingchun et al., Traffic Light Detection Based on Optimized YOLOv3 Algorithm, Acta Optica Sinica, 40(12): 1215001-1-1215001-9, 2020.

The Communication Pursuant to Article 94(3) EPC in European Application No. 22857563.5 mailed on Oct. 15, 2025, 7 pages.

\* cited by examiner

<u>100</u>

110

130

120

Network

150

Storage Device

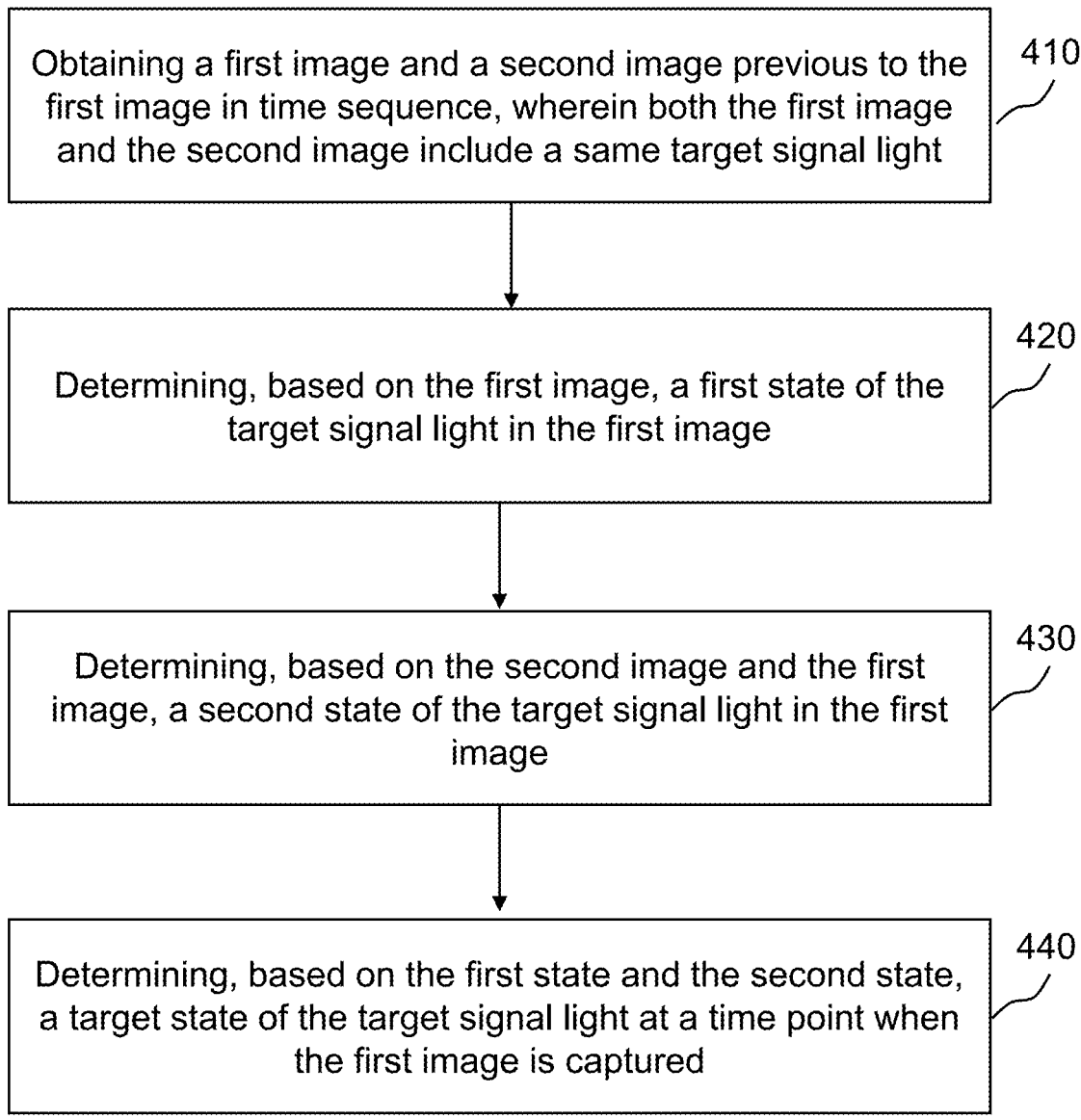

Obtaining a first image and a second image previous to the first image in time sequence, wherein both the first image and the second image include a same target signal light          410

Determining, based on the first image, a first state of the target signal light in the first image          420

Determining, based on the second image and the first image, a second state of the target signal light in the first image          430

Determining, based on the first state and the second state, a target state of the target signal light at a time point when the first image is captured          440

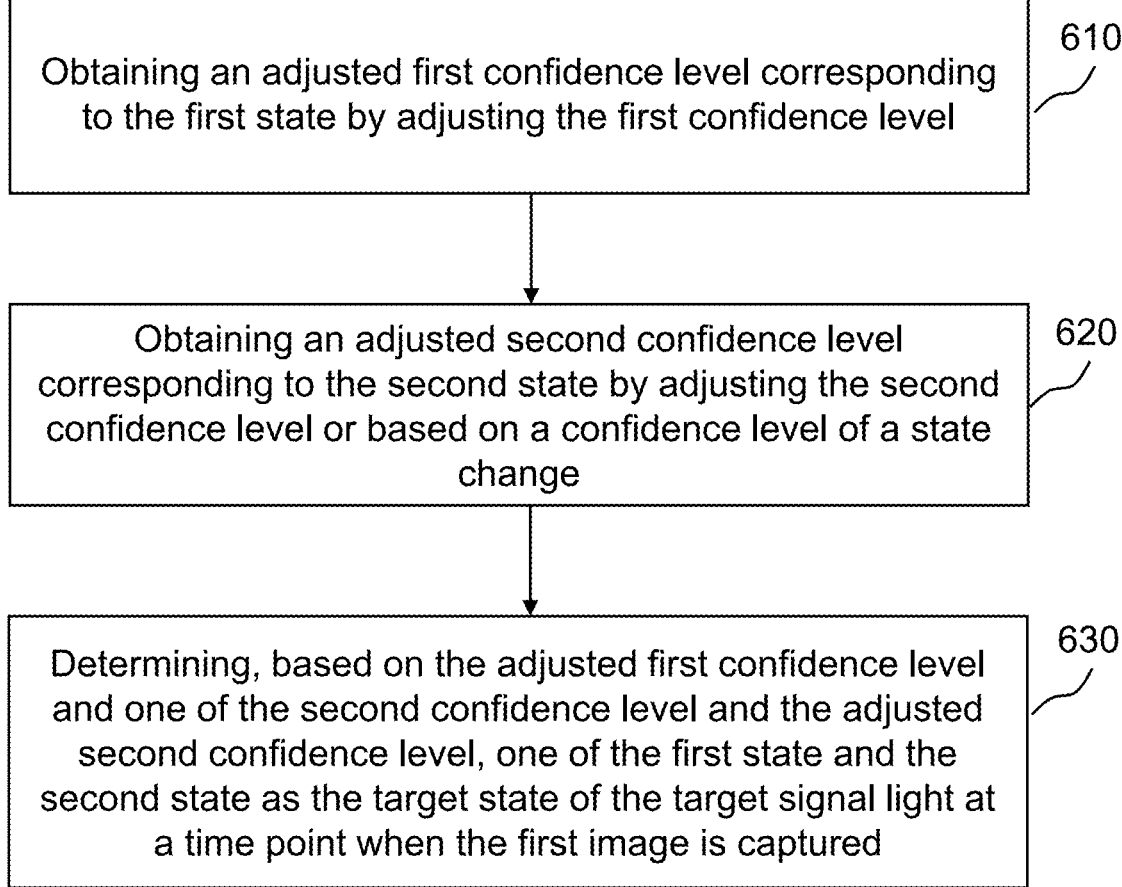

| | 610 |
| Obtaining an adjusted first confidence level corresponding to the first state by adjusting the first confidence level | |

| | 620 |
| Obtaining an adjusted second confidence level corresponding to the second state by adjusting the second confidence level or based on a confidence level of a state change | |

| | 630 |
| Determining, based on the adjusted first confidence level and one of the second confidence level and the adjusted second confidence level, one of the first state and the second state as the target state of the target signal light at a time point when the first image is captured | |

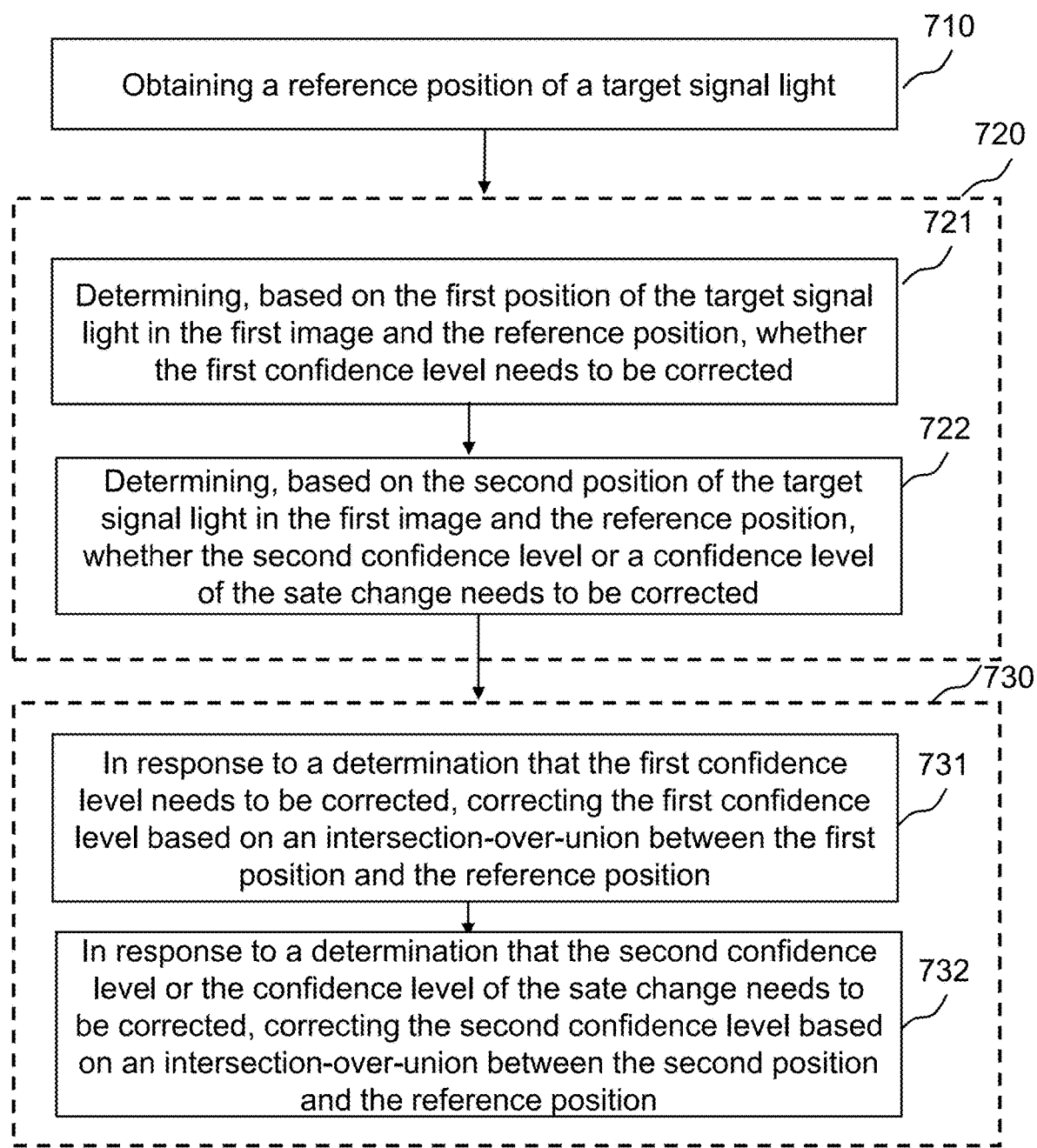

710

Obtaining a reference position of a target signal light

720

721

Determining, based on the first position of the target signal light in the first image and the reference position, whether the first confidence level needs to be corrected

722

Determining, based on the second position of the target signal light in the first image and the reference position, whether the second confidence level or a confidence level of the sate change needs to be corrected

730

731

In response to a determination that the first confidence level needs to be corrected, correcting the first confidence level based on an intersection-over-union between the first position and the reference position

732

In response to a determination that the second confidence level or the confidence level of the sate change needs to be corrected, correcting the second confidence level based on an intersection-over-union between the second position and the reference position

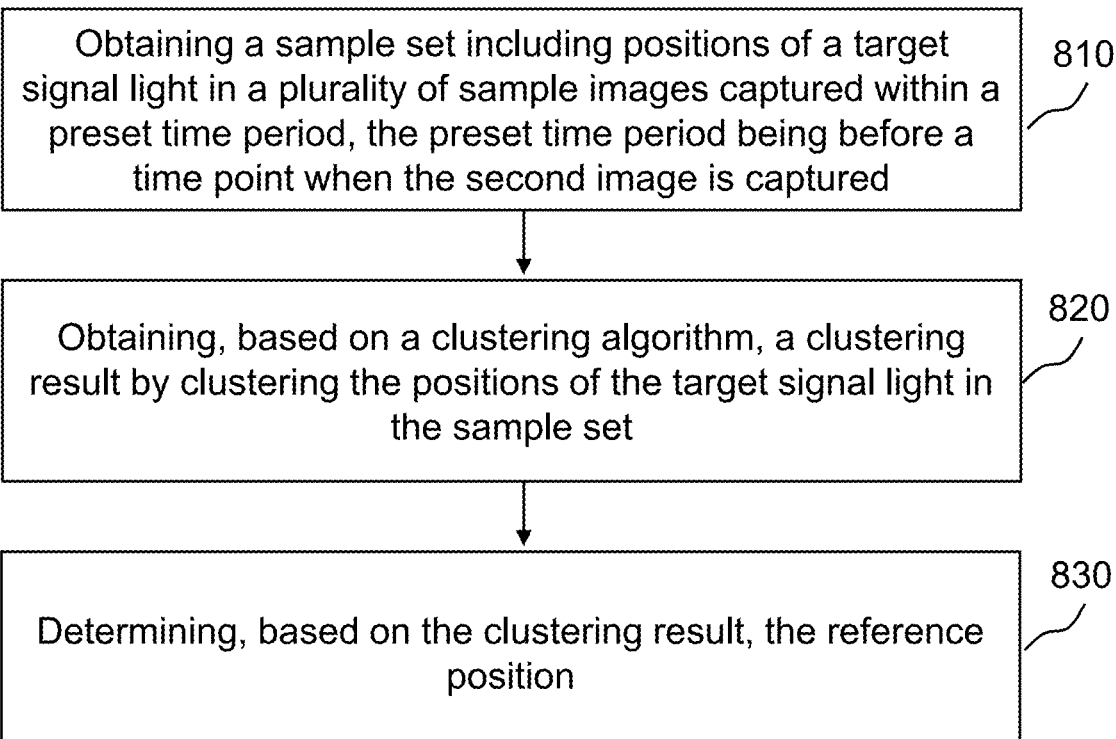

Obtaining a sample set including positions of a target signal light in a plurality of sample images captured within a preset time period, the preset time period being before a time point when the second image is captured

810

Obtaining, based on a clustering algorithm, a clustering result by clustering the positions of the target signal light in the sample set

820

Determining, based on the clustering result, the reference position

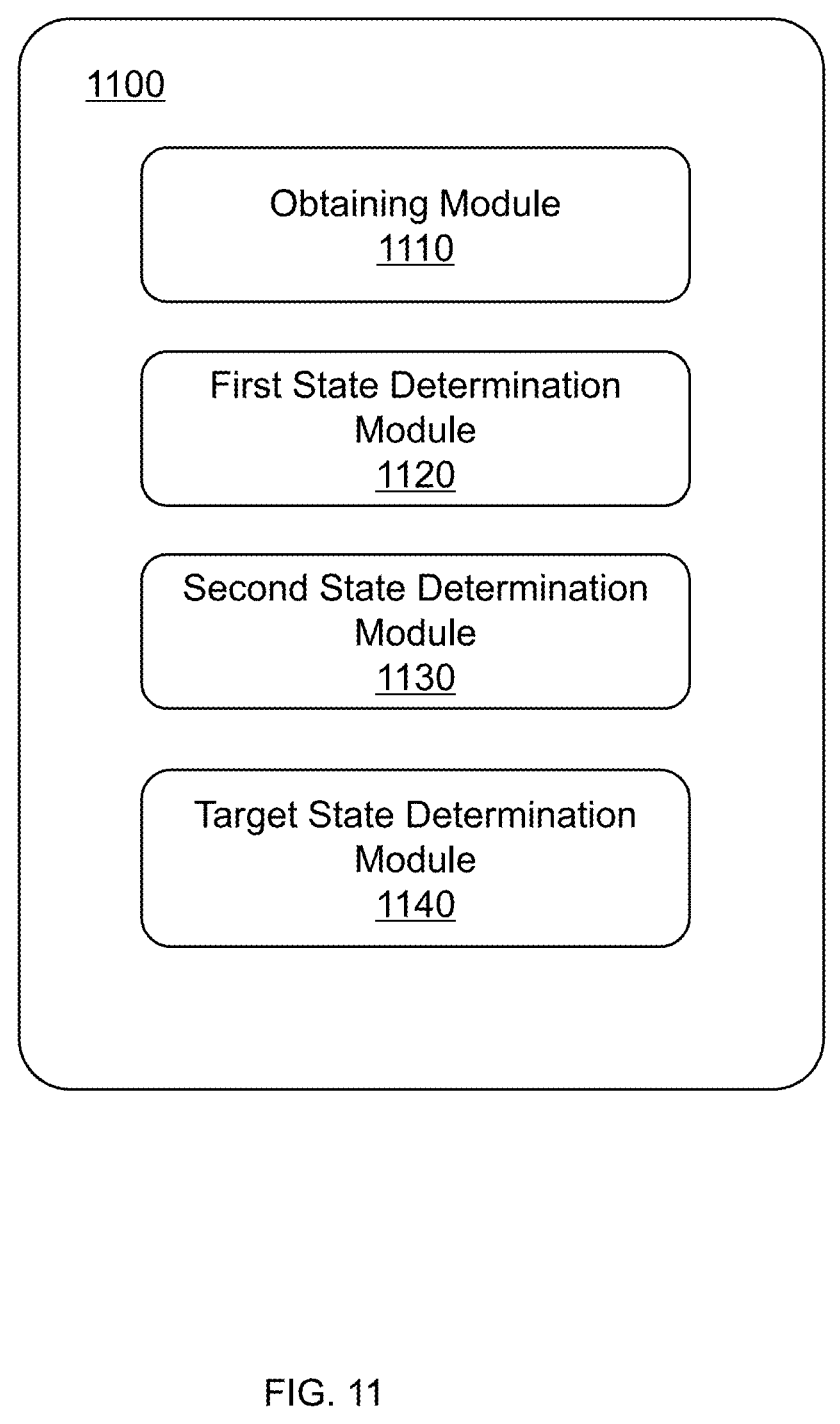

Obtaining Module
1110

First State Determination
Module
1120

Second State Determination
Module
1130

Target State Determination
Module
1140

FIG. 11

METHODS, SYSTEMS, AND COMPUTER-READABLE STORAGE MEDIUMS FOR DETECTING A STATE OF A SIGNAL LIGHT

CROSS-REFERENCE TO RELATED APPLICATIONS

This application is a continuation of International Application No. PCT/CN2022/108821, filed on Jul. 29, 2022, which claims priority of Chinese Patent Application No. 202110939496.9, filed on Aug. 16, 2021, the contents of which are entirely incorporated herein by reference.

TECHNICAL FIELD

The present disclosure relates to the field of image processing technology, and in particular to, methods and systems for detecting a state of a signal light.

BACKGROUND

In the scene of intelligent traffic control, the detection technology of signal lights is very important. However, in order to identify information such as a vehicle type, a vehicle color, a license plate number, a face in the vehicle, etc. at the same time, existing image acquisition devices require a long exposure time for video streams and captured images, which may make pixel values of a signal light area oversaturated, and color of a red light more like yellow or white, which is similar to color of a yellow light, thereby making it difficult to distinguish the red light from the yellow light.

Therefore, it is desirable to provide methods, devices, computer-readable storage mediums for detecting a signal light, which can improve the accuracy of determination of a signal light state, reduce false detection, improve the adaptability of state detection technology scenarios and control the cost at the same time.

SUMMARY

One of the embodiments of the present disclosure provides a method for detecting a signal light. The method for detecting a signal light may include: obtaining a first image and a second image previous to the first image in time sequence, wherein both the first image and the second image include a same target signal light; determining, based on the first image, a first state of the target signal light in the first image; determining, based on the second image and the first image, a second state of the target signal light in the first image; and determining, based on the first state and the second state, a target state of the target signal light at a time point when the first image is captured.

One of the embodiments of the present disclosure provides a device for detecting a signal light. The device for detecting a signal light may include a processor, a storage, and a communication circuit. The processor may be respectively coupled to the storage and the communication circuit. Program data may be stored in the storage. The processor may implement the method for detecting a signal light by executing the program data in the storage.

One of the embodiments of the present disclosure provides a computer-readable storage medium storing computer programs. The computer programs may be executed by a processor to implement the method for detecting a signal light.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein:

FIG. 1 is a schematic diagram illustrating an exemplary application scenario of a system for detecting a state of a signal light according to some embodiments of the present disclosure;

FIG. 4 is a flowchart illustrating an exemplary process for detecting a state of a signal light according to some embodiments of the present disclosure;

FIG. 6 is a flowchart illustrating an exemplary process for determining a target state based on a first confidence level and a second confidence level according to some embodiments of the present disclosure;

FIG. 7 is a flowchart illustrating an exemplary process for correcting a first confidence level or a second confidence level according to some embodiments of the present disclosure;

FIG. 8 is a flowchart illustrating an exemplary process for obtaining a reference position according to some embodiments of the present disclosure;

FIG. 11 is a block diagram illustrating an exemplary processing device for detecting a state of a signal light according to some embodiments of the present disclosure.

DETAILED DESCRIPTION

Figure 2:
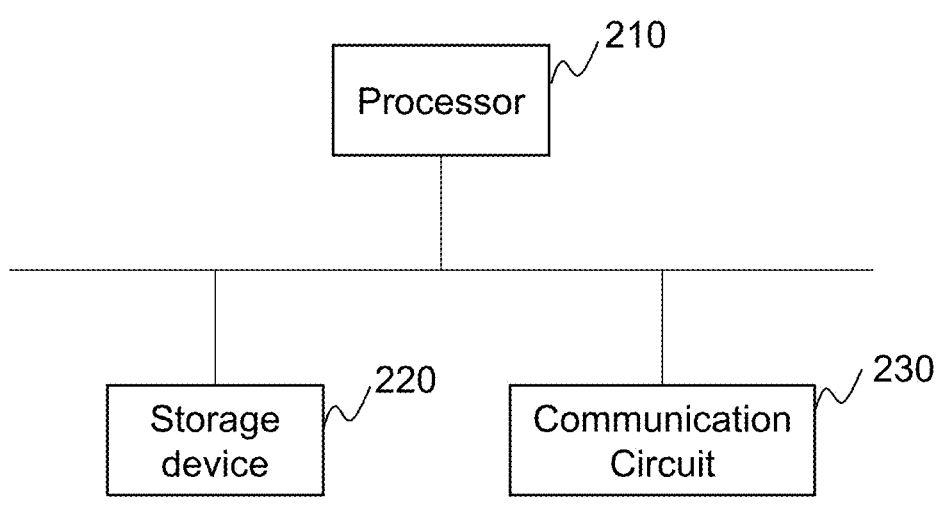
FIG. 2 is a schematic diagram illustrating an exemplary device for detecting a signal light according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an exemplary a system for detecting a state of a signal light according to some embodiments of the present disclosure. As illustrated in FIG. 1, the system for detecting a state of a signal light (also referred to as a detection system) 100 may include a processing device 110, a network 120, an image acquisition device 130, a terminal device 140, and a storage device 150.

The processing device 110 may process data and/or information obtained from the image acquisition device 130, the terminal device 140, and the storage device 150. For example, the processing device 110 may obtain images or videos of a target signal light captured by the image acquisition device 130 (e.g., a first image and a second image acquired before the first image). The processing device 110 may determine a first state of the target signal light in one of the images (e.g., the first image) based on the one of the images (e.g., the first image). As another example, the processing device 110 may determine a second state of the target signal light in the one of the images (e.g., the first image) based on at least two of the images (e.g., the first image and the second image), and determine a target state of the target signal light at a time point when the one of the images (e.g., the first image) is acquired by the image acquisition device 130. In some embodiments, the processing device 110 may be a single server or a server group. The server group may be centralized or distributed (e.g., the processing device 110 may be a distributed system). In some embodiments, the processing device 110 may be local or remote. For example, the processing device 110 may access information and/or data stored in or acquired by the image acquisition device 130, the terminal device 140, and/or the storage device 150 via the network 120. As another example, the processing device 110 may be directly connected to the image acquisition device 130, the terminal device 140, and/or the storage device 150 to access stored or acquired information and/or data. In some embodiments, the processing device 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the processing device 110 may be implemented by a computing device (e.g., a computing device including a processor, a storage, an input/output (I/O), and a communication port) or a mobile device (e.g., a mobile device including a communication platform, a display, a graphic processing unit (GPU), a central processing unit (CPU), an I/O, a memory, and a storage.

The image acquisition device 130 may include a camera, a video recorder, an image sensor, etc. The image acquisition device 130 may include a gun image acquisition device, a dome image acquisition device, an integrated image acquisition device, a monocular image acquisition device, a binocular image acquisition device, a multi-view image acquisition device, a visible light image acquisition device, a thermal imaging image acquisition device, or the like, or any combination thereof. The video recorder may include a PC digital video recorder (DVR), an embedded DVR, a visible light DVR, a thermal imaging DVR, or the like, or any combination thereof. The image sensor may include a charge coupled device (CCD) image sensor, a complementary metal oxide semiconductor (CMOS) image sensor, or the like, or any combination thereof. The image acquisition device 130 may be configured to capture one or more images or videos. In some embodiments, the image acquisition device 130 may include a binocular camera having two camera components. As used herein, a camera component may be a single camera including a lens unit, an image sensor unit, and/or one or more other units (e.g., a processor, a controller, etc.). In some embodiments, the two camera components may capture images or videos simultaneously or not. For example, one of the two camera components can be turned on while the other one can be turned off or on standby. In some embodiments, the two camera components may include the same or different cameras to adapt to different needs. For example, the two camera components may be implemented in the same configuration and may be used cooperatively to achieve a relatively wide shooting range. As another example, one camera component may include a telephoto camera, and the other one may include a wide-angle camera. A shooting range of the telephoto camera may be within a shooting range of the wide-angle camera. The wide-angle camera may have a relatively wide shooting range and provide coarse information of a relatively large area. The telephoto camera may have a relatively narrow shooting range and provide detailed information of a relatively small area (e.g., an area of interest within a relatively large area). In such cases, a fused image or video may be generated by fusing the images or videos acquired by the two camera components. The fused image or video may include both coarse information of a relatively large area and detailed information of an area of interest within the relatively large area. In some embodiments, the image acquisition device 130 may transmit the acquired images or videos to one or more components (e.g., the processing device 110, the terminal device 140, and/or the storage device 150) of the detection system 100 via the network 120.

The network 120 may facilitate the exchange of information and/or data for the detection system 100. In some embodiments, one or more components (e.g., the processing device 110, the image acquisition device 130, the terminal device 140, or the storage device 150) of the detection system 100 may communicate information and/or data with one or more other components of the detection system 100 via the network 120. For example, the processing device 110 may obtain/acquire images from the image acquisition device 130 via the network 120. As another example, the image acquisition device 130 may transmit images to the storage device 150 for storage via the network 120. In some embodiments, the network 120 may be any type of wired or wireless network, or combination thereof. In some embodiments, the network 120 may include one or more network access points. For example, the network 120 may include wired and/or wireless network access points such as base stations and/or internet exchange points through which one or more components of the detection system 100 may be connected to the network 120 to exchange data and/or information.

The terminal device 140 may be configured to receive information and/or data from the processing device 110, the image acquisition device 130, and/or the storage device 150 via the network 120. For example, the terminal device 140 may receive images and/or videos from the image acquisition device 130. As another example, the terminal device 140 may transmit instructions to the image acquisition device 130 and/or the processing device 110. In some embodiments, the terminal device 140 may include a mobile device 140-1, a computer 140-2, a wearable device 140-3, or the like, or any combination thereof. In some embodiments, the terminal device 140 may include a display that can display information in a human-readable form, such as text, image, audio, video, graph, animation, or the like, or any combination thereof. The display of the terminal device 140 may include a cathode ray tube (CRT) display, a liquid crystal display (LCD), a light-emitting diode (LED) display, a plasma display panel (PDP), a three dimensional (3D) display, or the like, or a combination thereof. In some embodiments, the terminal device 140 may be connected to one or more components (e.g., the processing device 110, the image acquisition device 130, and/or the storage device 150) of the detection system 100 via the network 120.

The storage device 150 may be configured to store data and/or instructions. The data and/or instructions may be obtained from, for example, the processing device 110, the image acquisition device 130, and/or any other component of the detection system 100. In some embodiments, the storage device 150 may store data and/or instructions that the processing device 110 may execute or use to perform exemplary methods described in the present disclosure. In some embodiments, the storage device 150 may include a mass storage device, a removable storage device, a volatile read-and-write memory, a read-only memory (ROM), or the like, or any combination thereof. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components (e.g., the processing device 110, the image acquisition device 130, or the terminal device 140) of the detection system 100. One or more components in the detection system 100 may access the data or instructions stored in the storage device 150 via the network 120. In some embodiments, the storage device 150 may be directly connected to or communicate with one or more components (e.g., the processing device 110, the image acquisition device 130, or the terminal device 140) of the detection system 100. In some embodiments, the storage device 150 may be part of another component of the detection system 100, such as the processing device 110, the image acquisition device 130, or the terminal device 140.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the detection system 100 may include one or more additional components and/or one or more components of the detection system 100 described above may be omitted. Additionally or alternatively, two or more components of the detection system 100 may be integrated into a single component. A component of the detection system 100 may be implemented on two or more sub-components.

FIG. 2 is a schematic diagram illustrating exemplary hardware and/or software components of an exemplary computing device 200 according to some embodiments of the present disclosure. In some embodiments, the processing device 110 may be implemented on the computing device 200. For example, the processing device 110 may be implemented on the computing device 200 and configured to perform methods as disclosed in this disclosure. It should be noted that the description of the computing device 200 in FIG. 2 is intended to be illustrative, and not to limit the scope of the present disclosure. For example, the detection device 200 may be any device with an image processing function, such as a mobile phone, a desktop computer, a tablet computer, etc., which is not limited herein.

As illustrated in FIG. 2, the computing device 200 may include at least one processor 210, at least one storage device 220, a communication circuit 230, or the like, or any combination thereof.

The communication circuit 230 may be configured to connect other components in the computing device 200 (e.g., the processors 210, the storage device 220, etc.). The communication circuit 230 may represent one or more bus structures. Exemplary bus structures may include a memory bus, a memory controller, a peripheral bus, a graphical acceleration port, a processor, or a local bus that uses any of several bus structures. For example, these bus structures may include an industry standards architecture (ISA) bus, a microchannel architecture (MAC) bus, an enhanced ISA bus, a video electronics standards association (VESA) local bus, a peripheral component interconnection (PCI) bus, or the like, or any combination thereof.

The at least one processor 210 may execute computer instructions (e.g., program codes) and perform functions of the processing device 110 in accordance with techniques described herein. The computer instructions may include, for example, routines, programs, objects, components, data structures, procedures, modules, etc., which perform particular functions described herein. For example, the at least one processor 210 may process data obtained from the processing device 110, the image acquisition device 130, the terminal device 140, the storage device 150, and/or any other component of the detection system 100.

Merely for illustration, only one processor is described in the computing device 200. However, it should be noted that the computing device 200 in the present disclosure may also include multiple processors, thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The at least one storage device 220 may store data/information obtained from the processing device 110, the image acquisition device 130, the terminal device 140, the storage device 150, and/or any other component of the detection system 100. The storage device 220 may include a computer readable medium in the form of a volatile memory, such as a random access memory (RAM), a cache memory, and/or a read-only memory (ROM). In some embodiments, the at least one storage device 220 may include a program/utility including at least one set of program modules. Such a program module may include an operating system, one or more applications, other program modules, program data, etc. Each or some combination of these embodiments may include an implementation of a network environment. The program module may perform functions and/or methods described in the embodiments of the present disclosure.

The computing device 200 may communicate with one or more external devices (e.g., a keyboard, a pointing device, a display, etc.). The computing device 200 may communicate with one or more devices that enable a user to interact with the computing device 200, and/or with any device (e.g., a network card, a modem, etc.) that enables the computing device 200 to communicate with one or more other computing devices. The communication may be performed through an input/output (I/O) interface. In addition, the computing device 200 may also communicate with one or more networks (e.g., a local area network (LAN), a wide area network (WAN), and/or a public network, such as the Internet) through a network adapter. It should be noted that, although not shown in FIG. 2, other hardware and/or software modules may be used in accordance with the computing device 200. The hardware and/or software modules may include, but not be limited to, a microcode, a device driver, a redundant processing unit, a drive array of external disks, a redundant array of independent disks (RAID) system, a tape drive, a data backup storage device, or the like, or any combination thereof. It may be considered that those skilled in the art may also be familiar with such structures, programs, or general operations of this type of computing device.

Figure 3:
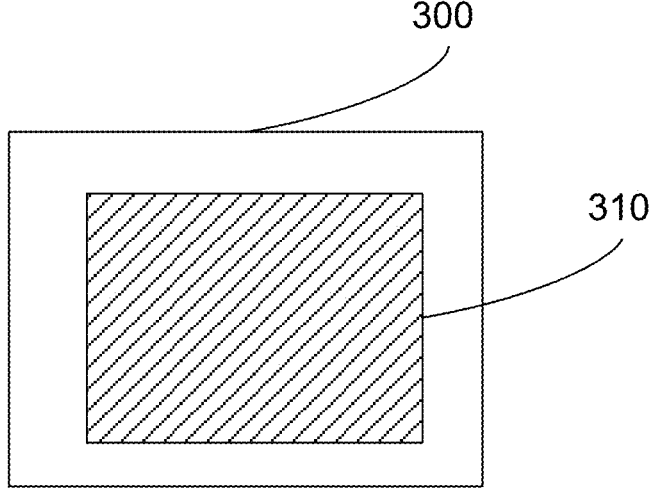
FIG. 3 is a schematic diagram illustrating an exemplary computer-readable storage medium according to some embodiments of the present disclosure.

FIG. 3 is a schematic diagram illustrating an exemplary structure of a computer-readable storage medium according to some embodiments of the present disclosure. The computer-readable storage medium 300 may store a computer program 310. The computer program 310 may be executed by a processor to implement the operations in any of the methods disclosed in the present disclosure. The computer-readable storage medium 300 may include a U disk, a mobile hard disk, a read-only memory (ROM), a random access memory (RAM), a magnetic disk, an optical disk, or the like, or any combination thereof, which may store the computer program 310. The computer-readable storage medium 250 may also include a server storing the computer program 310. In some embodiments, the computer-readable storage medium 300 may send the stored computer program 310 to other devices to execute. Alternatively, the computer-readable storage medium 300 may execute the stored computer program 310.

FIG. 4 is a flowchart illustrating an exemplary process for detecting a state of a signal light according to some embodiments of the present disclosure. As shown in FIG. 4, the process 400 may include the following operations. In some embodiments, the process 400 may be executed by the processing device (e.g., the processing device 110).

In 410, a first image and a second image previous to the first image in time sequence may be obtained. Both the first image and the second image may include a same target signal light. In some embodiments, operation 410 may be performed by the obtaining module 1110.

The first image may refer to an image including a state of the target signal light to be detected (e.g., a target signal light). The first image may also be referred to as an image to be detected (i.e., a current image). The second image previous to the first image may refer to an image including a state of the target signal light to be detected that is acquired by an image acquisition device (e.g., the image acquisition device 130) before the first image is acquired by the image acquisition device. The second image may also be referred to as a historical image. In some embodiments, the second image may be taken at a previous time. The first image may be taken at a later time. Both the first image and the second image may include the same target signal light. In some embodiments, from the time when the second image is acquired to the time when the first image of the target signal light is acquired, a count of changes in the state of the target signal light may be less than or equal to 1 time. In some embodiments, the first image and the second image may represent a field of view of a monitoring image acquisition device and may include other objects other than the target signal light, such as a road, a pedestrian, a light panel, etc.

In some embodiments, the first image and the second image may belong to image data (e.g., image frames) in one same video stream. The first image and the second image may be in a YUV format. The second image may be a previous and consecutive image frame of the first image, or may be an image frame spaced several frames from the first image. For example, there may be one frame, two frames, four frames, etc., between the second image and the first image. For the convenience of description, the second image may be taken as a previous image frame of the first image for description.

The target signal light may refer to a signal light with a state that needs to be determined. In some embodiments, the target signal light may be configured to provide a monochromatic light. For example, the target signal light may provide a red light, or a yellow light, or green light. In some embodiments, the target signal light may be configured to provide different colors of light at different times. For example, the target signal light may be configured to provide at least two of three colors of red light, green light, and yellow light, and a conversation thereof.

In some embodiments, when the target signal light provides a monochromatic light, the target signal light may need to cooperate with at least one other signal light to achieve a complete signal light logic. In some embodiments, the complete signal light logic may including switching a red light to green light and switching a green light to a yellow light. In some embodiments, when the target signal light is configured to provide a red light, a green light, and a yellow light, the target signal light may achieve the complete signal light logic.

In some embodiments, a count of target signal lights in the first image and the second image may be one or two or more. When the count of target signal lights is more than one, subsequent operations may be respectively performed for different target signal lights, and a target state of each target signal light in the first image may be obtained.

In some embodiments, the processing device 110 may obtain the first image and the second image previous to the first image in time sequence from the image acquisition device. For example, the image acquisition devices at different intersections may capture video streams of signal lights installed at the intersections. The processing device 110 may obtain a video stream of a certain intersection from the image acquisition device, and obtain the first image from the video stream through video processing, and obtain the second image that is taken before the first image from the video stream. In some embodiments, the processing device 110 may obtain the first image and the second image previous to the first image in time sequence from storage (e.g., the storage device 150).

In some embodiments, the processing device 110 may perform a preprocessing operation on at least one of the first image or the second image.

In some embodiments, the processing device 110 may perform color conversion on at least one of the first image or the second image. For example, the processing device 110 may perform color conversion on at least one of the first image or the second image through a conversion model. For example, the processing device 110 may convert YUV format data of at least one of the first image or the second image into RGB format data according to the conversation model denoted as Equations (1), (2), (3) as follows:

$$R = Y + 1.402 \times V, \tag{1}$$

$$G = Y - 0.344 \times U - 0.714 \times V, \tag{2}$$

$$B = Y + 1.772 \times U, \tag{3}$$

where (Y, U, V) denotes data of one of the first image and the second image in YUV format and (R, G, and B) denote data of one of the first image and the second image in RGB format.

As another example, the processing device 110 may perform color conversion on the first image through a trained first machine learning model. As another example, the processing device 110 may perform color conversion on the first image and the second image through a trained second machine learning model. More descriptions regarding the trained first machine learning model and the trained second machine learning model may be found elsewhere in the present disclosure (for example, the operation 420 and the operation 430).

In some embodiments, the processing device 110 may perform region of interest (ROI) extraction on at least one of the first image or the second image. The ROI may include a region of a light panel where the target signal light is located.

In some embodiments, if a count of target signal lights in the first image and the second image is two or more, in order to improve detection efficiency, the processing device 110 may extract an ROI in each of the first image and the second image. An ROI may refer to a region including a light panel (also referred to as a light panel region) where at least one target signal light is located. The light panel region may display or represent a complete signal light logic. An ROI may correspond to a complete signal light logic (also referred to as a logic region of a signal light). The logic region of a signal light may represent a complete signal light logic. For example, if the target signal light can only emit monochromatic light, an ROI may include the target signal light that can emit one of red light, green light, and yellow light and other signal lights that can emit remaining of red light, green light, and yellow light excepting light in a color that the target signal light can emit. As another example, when the target signal light can emit red light, green light, and yellow light, the ROI may only include the target signal light. In some embodiments, there may be no overlap between different ROIs in the first image or the second image, which may avoid confusion of the signal light logic.

In some embodiments, the ROI may be larger than the light panel region. For example, the ROI may include the light panel region, and the light panel region may be located in the ROI.

Accordingly, it can be avoided that the ROI is separated from the logic region of the signal light due to shaking or swaying of the image acquisition device, thereby enhancing stability of for state detection of a signal light.

In some embodiments, the processing device 110 may perform ROI extraction on at least one of the first image or the second image. In some embodiments, a position of the light panel where the target signal light is located in images taken by one same image acquisition device may be basically unchanged, and the processing device 110 may obtain predetermined position information of the ROI according to the position of the light panel in the images acquired by the image acquisition device. If the light panel region in the ROI includes a plurality of target signal lights, the position information of the ROI may include the position of each target signal light. After the predetermined position information of the ROI is determined, the processing device 110 may perform ROI extraction on at least one of the first image or the second image according to the predetermined position information of the ROI. In some embodiments, if an intersection includes a plurality of lanes, one lane may correspond to one light panel, and the plurality of lanes may correspond to a plurality of light panels. Each of the first image or the second image may include a plurality of ROIs. The processing device 110 may extract the plurality of ROIs from the each of the first image or the second image, perform clustering processing on the plurality of ROIs through a clustering algorithm, and classify the ROIs into several categories. For example, different categories may correspond to different lanes, and ROIs in the same category may correspond to the same lane. For example, lane 1 may correspond to ROI 1. Lane 2 may correspond to ROI 2, etc. In some embodiments, through the clustering processing, two ROIs with a distance that is less than a distance threshold may belong to one same category. Two ROIs with a distance that is greater than the distance threshold may belong to different categories. In some embodiments, two ROIs with a distance that is equal to the distance threshold may belong to one same category or different categories. In some embodiments, after the clustering processing, in the same category, any two ROIs may have a distance that is less than the distance threshold. In different categories, the distance between any two ROIs in different categories may be greater than or equal to the distance threshold.

In some embodiments, the processing device 110 may determine a distance between position points in two ROIs, and determine the distance between position points in the two ROIs as the distance between the two ROIs. For example, a distance between two upper left vertices or the center points of the two ROIs may be determined as the distance between the two ROIs.

In some embodiments, after a category of the ROI is determined, the processing device 110 may set a detection region corresponding to each category. The detection region may include all or at least part of the ROIs in one same category. For example, the processing device 110 may mark or represent the detection region by a detection box (e.g., a rectangular box). The detection box may include all ROIs of a corresponding category. A count of detection boxes may be the same as a count of categories of ROIs. In some embodiments, the processing device 110 may set each detection box with one same size.

It should be noted that the detection region (for example, a detection box) in the first image may have a corresponding detection region in the second image. That the above two detection regions correspond to each other may refer to that the two detection regions include ROIs of one same category. When the first image and the second image are taken at the same angle, the positions and the count of the detection regions in the first image may be the same as those in the second image. The processing device 110 may determine the position of the detection region in one of the first image or the second image, and then may apply the determined detection region to the other one of the first image or the second image. The ROI in the first image may have a corresponding ROI in the second image. When the first image and the second image are taken at the same angle, the processing device 110 may extract the ROI of one of the first image or the second image, and then may apply the extracted ROI to the other one of the first image or the second image.

In some embodiments, after the ROI is determined, the processing device 110 may extract or cut out each ROI from the first image and the second image to obtain extracted images, and then determine a first state or a second state based on the extracted images. For example, the extracted first image generated after the ROI is extracted from the first image may be input into the first machine learning model to determine the first state. As another example, the extracted first image and the extracted second image generated after the ROI is extracted from the first image and the second image may be input into the second machine learning model to determine the second state.

As described herein, extracting the ROI or the detection region from the image may refer to segmenting the ROI or the detection region from the image, so that the segmented image may only include the ROI or the detection region.

In some embodiments, the processing device 110 may determine the first state and second state of a plurality of target signal lights at the same time, thereby improving the detection efficiency. In some embodiments, since the processing device 110 may determine the first state and the second state of each of the plurality of target signal lights to obtain a detection result, the final detection result may include the first state and the second state corresponding to each of the plurality of target signal lights. In order to facilitate subsequent processing, after the first state and the second state are determined, the processing device 110 may allocate the detection result to the corresponding ROI. For example, if the detection result is determined by the first machine learning model and the second machine learning model, the processing device 110 may allocate the first state and the second state output by the first machine learning model and the second machine learning model to corresponding ROI, for subsequent processing. When the ROI includes a plurality of target signal lights, the processing device 110 may further allocate the detection result of the ROI to each target signal light of the plurality of target signal lights. For example, the processing device 110 may determine the detection result of each target signal light in the ROI according to the correspondence between the position of each target signal light and the position information of the ROI.

In 420, a first state of the target signal light in the first image may be determined based on the first image. In some embodiments, operation 420 may be performed by the first state determination module 1120.

The first state may refer to a state of the target signal light determined through the first image. In some embodiments, the first state may include a light-on state or a light-off state.

In some embodiments, the first state may include a light-on state. The light-on state of the first state may include a green light state, a yellow light state or a red light state.

In some embodiments, the processing device 110 may determine the first state of the target signal light in the first image by identifying the first image (or the pre-processed first image). For example, the processing device 110 may determine the first state of the target signal light in the first image by identifying the position of the target signal light in the first image and the color corresponding to the position in the first image. As another example, when the first state is at least one of the yellow light state or the red light state, the processing device 110 may distinguish the red light state and the yellow light state based on switching of the position of the target signal light. For example, the processing device 110 may unify the yellow light state and the red light state into one category, which may be recorded as the yellow light state. The processing device 110 may determine the red light state based on a switching of the position of the target signal light. As another example, the processing device 110 may directly output the first state by using an electronic signal detector connected with the target signal light or a controller of the target signal light.

In some embodiments, the processing device 110 may determine, based on a trained first machine learning model, the first state by processing the first image. The trained first machine learning model may determine the first state based on position information and color information of the target signal light in the first image.

The trained first machine learning model may include a deep neural network, a convolutional neural network, a recurrent neural network, a graph neural network, etc.

In some embodiments, the first machine learning model may include a plurality of structural layers, such as a convolutional layer, an activation layer, a pooling layer, an upsampling layer, a cascade operation layer, etc. The processing device 110 may input the RGB format data (e.g., the first image in the RGB format) into the first machine learning model for calculation through the network forward propagation. The trained first machine learning model may also be referred to as a state model. More descriptions regarding the trained first machine learning model may be found elsewhere in the present disclosure (for example, FIG. 12).

In some embodiments, an input of the trained first machine learning model may include the first image or the pre-processed first image. For example, the pre-processed first image may be a first image after color conversion, for example, a first image of RGB format data. The first image may include position information and color information of the target signal light.

In some embodiments, an output of the trained first machine learning model may include the first state and a first confidence level of the first state.

In some embodiments, the output of the trained first machine learning model may include a multi-dimension matrix (also referred to as a first multi-dimension matrix). The multi-dimensional matrix may represent relevant information of the target signal light at different positions in the first image. Each of elements in the multi-dimensional matrix may correspond to a pixel in the first image or the pre-processed first image. For example, each element in the multi-dimensional matrix may represent whether a pixel corresponding to the each element represents a portion of the target signal light, the state corresponding to the portion of the target signal light (e.g., the first state, etc.) denoted by the pixel, and a confidence level of the state corresponding to the portion of the target signal light denoted by the pixel, etc. Each element in the multi-dimensional matrix may be denoted by a vector (also referred to as a feature vector) include one or more values indicating whether a pixel corresponding to the each element represents a portion of the target signal light, the state corresponding to the portion of the target signal light (e.g., the first state, etc.) denoted by the pixel, and a confidence level of the state corresponding to the portion of the target signal light denoted by the pixel, etc. For example, a value indicating that a pixel corresponding to the each element represents a portion of the target signal light may be 1, a value representing the red light state corresponding to the portion of the target signal light (e.g., the first state, etc.) denoted by the pixel may be 1, and a value representing the confidence level of the red light state corresponding to the portion of the target signal light denoted by the pixel may be 0.9. The processing device 110 may perform a post-processing operation on the multi-dimensional matrix output of the first machine learning model to obtain the first state and the first confidence level of the first state. For example, the processing device 110 may determine the first state based on confidence levels of different portions of the target signal light in the first image according to the multi-dimensional matrix. As a further example, the processing device 110 may determine confidence levels that exceed a threshold and determine the first state based on the confidence levels that exceed a threshold. The processing device 110 may designate a state corresponding to an average value of the confidence levels that exceed the threshold as the first state and the average value of the confidence levels that exceed the threshold as the first confidence level. As a still further example, the processing device 110 may perform a filtering operation (e.g., using a non-maximum suppression algorithm) on the confidence levels of different portions of the target signal light in the multi-dimensional matrix to obtain filtered confidence levels and determine the first state based on the filtered confidence levels. The processing device 110 may designate a state corresponding to a maximum value or an average value of the filtered confidence levels as the first state and the maximum value or the average value of the filtered confidence levels as the first confidence level of the first state.

In some embodiments, the trained first machine learning model may be obtained based on a plurality of training samples and training labels. In some embodiments, the training sample may include a sample first image. The label may be a sample multi-dimensional matrix corresponding to the sample first image. In some embodiments, the label may include a sample confidence level and/or sample first state of a sample signal light in the sample first image. Training data may be obtained based on historical data. The label of the training data may be determined by manual labeling or automatic labeling.

In some embodiments of the present disclosure, the processing device 110 may determine the first state based on the trained first machine learning model, which can improve the efficiency and accuracy of identifying the first state.

In 430, a second state of the target signal light in the first image may be determined based on the second image and the first image. In some embodiments, operation 430 may be performed by the second state determination module 1130.

The second state may refer to a state of the target signal light determined through the first image and the second image. The second state may include a light-on state or a light-off state. The light-on state of the second state may include a green light state, a yellow light state, or a red light state.

In some embodiments, the processing device 110 may determine the second state of the target signal light in the first image based on information in a time domain of the target signal light in the second image and the first image. For example, the processing device 110 may obtain a historical state (e.g., a historical target state) of the target signal light in the second image. The processing device 110 may determine the second state of the target signal light in the first image based on a relationship (e.g., a time interval) between an acquisition time of the second image and an acquisition time of the first image and a logical relationship of state change of the signal light (i.e., the complete signal light logic). For example, the historical state of the target signal light in the second image may be a yellow light state. The acquisition time of the first image may be after the acquisition time of the second image. The logical relationship of the state change of the signal light may include that the yellow light state turns into a red light state, a duration of the yellow light state, and/or a duration of the red light state. The processing device 110 may determine that the second state of the target signal light in the first image may be the red light state, or determine that the second state of the target signal light in the first image may be the red light state if a difference between the acquisition time of the second image and the acquisition time of the first image exceeds the duration of the yellow light state. As another example, the processing device 110 may determine a state change of the target signal light from a time point when the second image is captured to a time point when the first image is captured by processing the second image and the first image based on the trained second machine learning model. The processing device 110 may determine, based on a target state of the target signal light at a time point when the second image is captured and the state change, the second state of the target signal light in the first image.

The state change may be a change of the state of the target signal light from a time point when the second image is acquired (a moment of shooting) to a time point when the first image is acquired (a moment of shooting). Since the target signal light emits monochromatic light or emits different colors of light at different times, the state change may include off to on (referred to as light on), color change (referred to as light changed), no color change (referred to as light unchanged), from on to off (referred to as light unchanged), etc. Since the state change is obtained based on the second image and the first image, the state change may be obtained using information in a time domain.

In some embodiments, the processing device 110 may determine the second state by processing, based on a trained second machine learning model, the second image, and the first image. The second machine learning model may determine the second state based on information in a time domain of the target signal light in the first image and in the second image.

The trained second machine learning model may include a deep neural network, a convolutional neural network, a recurrent neural network, a graph neural network, etc.

In some embodiments, the second machine learning model may include a plurality of structural layers, such as a convolutional layer, an activation layer, a pooling layer, an upsampling layer, a cascade operation, etc. In some embodiments, the trained second machine learning model may also be referred to as a conversion model. The first image and the second image may be taken at different times. The target signal light in the first image and the second image may have corresponding information in a time domain. More descriptions regarding the second machine learning model may be found elsewhere in the present disclosure (e.g., FIG. 12).

In some embodiments, the trained second machine learning model may have the same structure as the trained first machine learning model. In some embodiments, the trained second machine learning model may have different structures from the trained first machine learning model.

In some embodiments, an input of the trained second machine learning model may include the first image, and the second image. In some embodiments, an input of the trained second machine learning model may include the preprocessed first image and the preprocessed second image. For example, the pre-processed first image or the pre-processed second image may be an image after color conversion, for example, the first image or the second image of RGB format data.

In some embodiments, the output of the trained second machine learning model may include the second state and a second confidence level of the second state.

Figure 10:
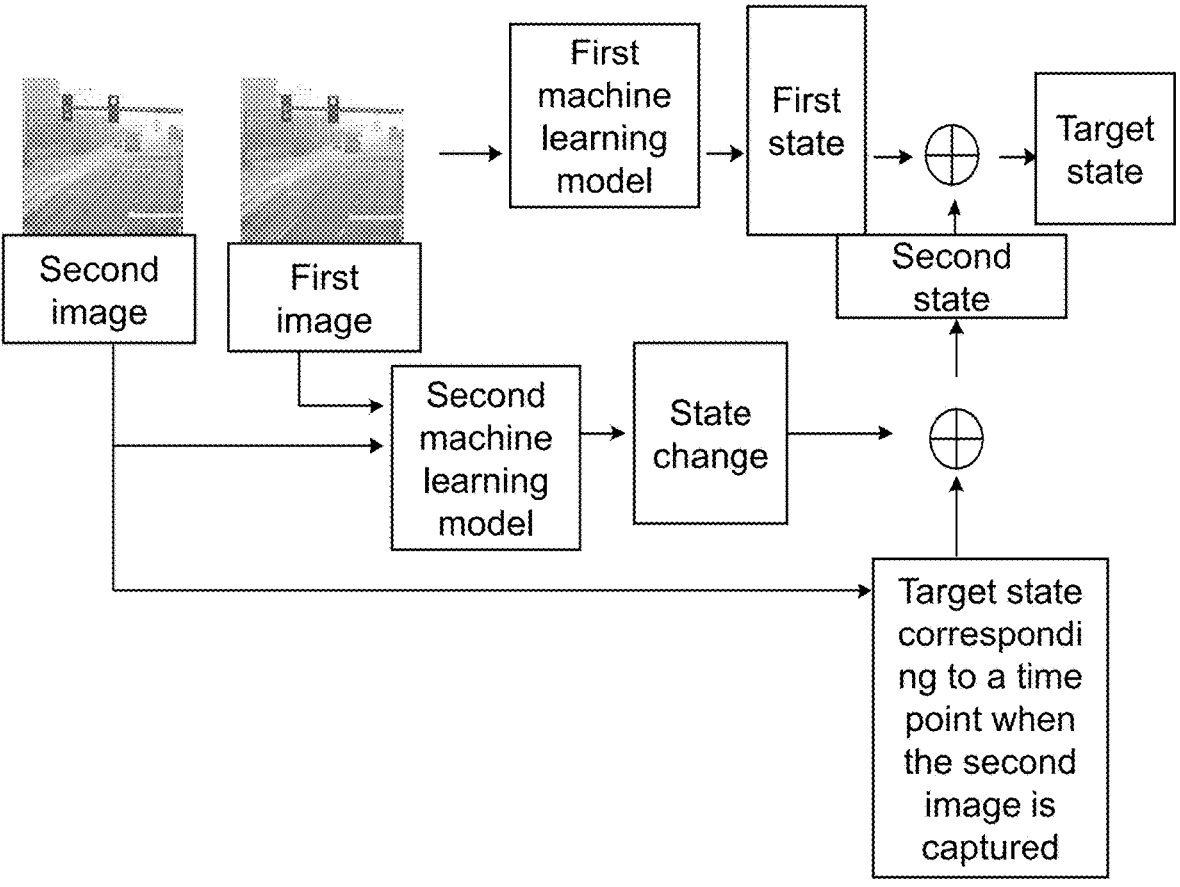
FIG. 10 is a schematic diagram illustrating an exemplary method for detecting a state of a signal light according to some embodiments of the present disclosure.

More descriptions regarding determination of a second state of the target signal light in the first image, for example, FIG. 10. In some embodiments, the output of the trained second machine learning model may include a multi-dimension matrix (also referred to as a second multi-dimension (e.g., 2D) matrix). Each of elements in the second multi-dimensional matrix may correspond to a pixel in the first image and a corresponding pixel in the second image. Two corresponding pixels in the first image and the second image may be located in the same positions of the first image and the second image and represent the same portion of the target signal light. In some embodiments, the second multi-dimension matrix may represent states of different portions of the target signal light in the first image, confidence levels of the states corresponding to different portions of the target signal light, etc. The processing device 110 may determine the second state and the second confidence level based on the second multi-dimension matrix according to the determination of the first state and the first confidence level based on the first multi-dimension matrix.

In some embodiments, the second multi-dimension matrix may represent the second multi-dimensional matrix may represent state changes of different portions of the target signal light in the first image, confidence levels of the state change corresponding to different portions of the target signal light, etc. For example, each element in the second multi-dimensional matrix may represent whether a pixel corresponding to the each element represents a portion of the target signal light, the state change corresponding to the portion of the target signal light (e.g., the first state, etc.) denoted by the pixel, and a confidence level of the change state corresponding to the portion of the target signal light denoted by the pixel, etc. Each element in the second multi-dimensional matrix may be denoted by a vector (also referred to as a feature vector) including one or more values indicating whether a pixel corresponding to the each element represents a portion of the target signal light, the state change corresponding to the portion of the target signal light (e.g., the first state, etc.) denoted by the pixel, and a confidence level of the state change corresponding to the portion of the target signal light denoted by the pixel, etc. For example, a value indicating that a pixel corresponding to the each element represents a portion of the target signal light may be 1, a value representing the state change of light on corresponding to the portion of the target signal light denoted by the pixel may be 1, and a value representing the confidence level of the state change of light on corresponding to the portion of the target signal light denoted by the pixel may be 0.8.

In some embodiments, the processing device 110 may perform a post-processing operation on the second multi-dimensional matrix to obtain the state change and the confidence level of the state change. For example, the processing device 110 may determine confidence levels that exceed a threshold in the second multi-dimensional matrix and determine the state change based on the confidence levels that exceed a threshold in the second multi-dimensional matrix. The processing device 110 may designate a state change corresponding to an average value of the confidence levels that exceed the threshold in the second multi-dimensional matrix as the state change and the average value of the confidence levels that exceed the threshold in the second multi-dimensional matrix as the confidence level of the state change. As another example, the processing device 110 may perform a filtering operation (e.g., using a non-maximum suppression algorithm) on the confidence levels of different portions of the target signal light in the second multi-dimensional matrix to obtain filtered confidence levels and determine the state change based on the filtered confidence levels. The processing device 110 may designate a state change corresponding to a maximum value or an average value of the filtered confidence levels as the state change and the maximum value or the average value of the filtered confidence levels as the confidence level of the state change. In some embodiments, the trained second machine learning model may be obtained by training based on a plurality of training samples and training labels. In some embodiments, the training sample may include a sample first image and a sample second image. The label may be a sample multi-dimensional matrix corresponding to the sample first image. In some embodiments, the label may include a sample confidence level and/or sample first state of a sample signal light in the sample first image. Training data may be obtained based on historical data. The label of the training data may be determined by manual labeling or automatic labeling.

In some embodiments, the processing device 110 may perform a regional allocation operation. For example, the processing device 110 may allocate the first state, the state change (or the second state) to the corresponding ROI according to the position information. In some embodiments, the processing device 110 may filter out some false detections outside the ROI. For example, the processing device 110 may obtain position information of the ROI. The processing device 110 may determine, based on the position information of the ROI, whether a position corresponding to the first state, the state change or the second state is located within a position of the ROI. The processing device 110 may filter out the first state, the state change or second state outside the position of the ROI. In some embodiments, the processing device 110 may allocate the first state, the state change and/or second state of filtered out of the false detections to the corresponding ROI for further processing. For example, the processing device 110 may determine the target state of the target signal light at a time point when the first image is captured based on the first state and/or second state). More descriptions regarding the determining the target state of the target signal light based on the first state and/or the second state may be found elsewhere in the present disclosure (for example, the operation 440 and FIG. 6 and the descriptions thereof).

In some embodiments of the present disclosure, the processing device 110 may determine the second state based on the trained second machine learning model by using information in a time domain in a historical image and a current image, which can improve the efficiency and accuracy of identifying the second state. In some embodiments of the present disclosure, both the first machine learning model and the second machine learning model may be a pre-trained network model (e.g., a deep convolutional neural network model). Through learning, training, and testing of a large number of monitoring scene samples, the processing device 110 may obtain model parameters with a high recognition rate, accurately detect information such as the position and the state (a red light state, a green light state, a yellow light state, etc.) of the signal lights, greatly remove interference of non-signal light regions such as a car light, a body color, a street light, etc. There may be no need to set a threshold parameter based on the red light information and the green light information, control a long and short exposure time of an image acquisition device, add a light filter, etc., which can reduce the workload of manual parameter adjustment.

In some embodiments, the processing device 110 may determine, based on a target state of the target signal light at a time point when the second image is captured and the state change, the second state of the target signal light in the first image.

The target state of the target signal light at a time point when the second image is captured may refer to a determined target state of the target signal light at the time point when the second image is captured. For example, the target state of the target signal light at the time point when the second image is captured that is determined by the processing device 110 through a state detection technique. As another example, the processing device 110 may determine the target state of the target signal light at the time point when the second image is captured through a process of the present disclosure (for example, the process 400). In some embodiments, the target state of the target signal light at the time point when the second image is captured may be a state obtained based on the second image and the trained first machine learning model. In some embodiments, the processing device 110 may determine, based on a signal light logic corresponding to the target signal light and the state change, the target state of the target signal light when the second image is captured, the second state of the target signal light in the first image. For example, the target state of the target signal light at the time point when the second image is captured may be a green light state, and the state change may be that the color has not changed. The processing device 110 may determine that the second state of the target signal light in the first image is a green light state.

The signal light logic corresponding to the target signal light may be a default setting of the system. The signal light logic corresponding to the target signal light may refer to an arrangement of states (e.g., a red light state, a yellow light state, a green light state and/or a light off state) of the target signal light in time sequence within a change cycle. For example, a signal light logic may include switching red light to green light and switching green light to yellow light.

In some embodiments, when the target signal light can only emit monochromatic light, the signal light logic corresponding to the target signal light may also include other signal lights in addition to the target signal light. When the target signal light may provide red light, green light and yellow light (that is, the target signal light can emit red light, yellow light and green light), the signal light logic corresponding to the target signal light may only include the target signal light.

For example, if the target signal light may provide red light, green light and yellow light, when the state change is that the color of the target signal light changes and the historical state of the target signal light in the second image is a red light state, the processing device 110 may determine that the second state of the target signal light in the first image is a green light state. As another example, if the target signal light may provide red light, green light and yellow light, when the state change is that the target signal light is from off to on and the historical state of the target signal light in the second image is a yellow light state, the processing device 110 may determine that the second state of the target signal light in the first image is in a red light state. In some embodiments of the present disclosure, determining the second state of the target signal light in the first image based on the target state of the target signal light at a time point when the second image is captured and the state change can improve the efficiency and accuracy of determining the second state. In some embodiments of the present disclosure, through the time domain relationship between the red light, the yellow light and the green light, the processing device 110 can accurately distinguish the red light state and the yellow light state of the signal light by using the signal light logic such as green light to yellow light and yellow light to red light, which can avoid the problem that the position determination for state detection is not applicable in some scenes, and the scene adaptability is stronger.

In 440, a target state of the target signal light at a time point when the first image is captured may be determined based on the first state and the second state. In some embodiments, operation 440 may be performed by the target state determination module 1140.

The target state may include one of a green light, a yellow light state, and a red light state. The target state may also be referred to as a current state.

In some embodiments, the processing device 110 may determine, based on the first state and the second state, the target state of the target signal light at a time point when the first image is captured. More descriptions regarding determination of the target state of the target signal light at a time point when the first image is captured, for example, FIG. 10.

In some embodiments, the processing device 110 may obtain a first confidence level of the first state. The processing device 110 may obtain, based on a confidence level of the state change, a second confidence level of the second state or an adjusted second confidence level. The processing device 110 may determine, based on the first confidence level and one of second confidence level and the adjusted second confidence level, the target state.

The first confidence level may refer to a reliability that the state of the target signal light in the first image is the first state. The confidence level of the state change may refer to a reliability of the state change of the target signal light. The second confidence level may refer to a reliability that the state of the target signal light in the first image is the second state. In some embodiments, the first confidence level, the confidence level corresponding to the state change, or the second confidence level may be a real value between 0 and 1. The larger the value of the first confidence level, the higher the probability that the state of the target signal light in the first image is the first state. The larger the value of the confidence level corresponding to the state change, the more credible the state change may be. The larger the value of the second confidence level, the higher the probability that the state of the target signal light in the first image is the second state.

In some embodiments, the processing device 110 may compare the first confidence level with the second confidence level, and determine one of the first state and the second state whose confidence level is larger as the target state. For example, the first confidence level may be 0.8. The second confidence level may be 0.95. The processing device 110 may determine the second state corresponding to the second confidence level as the target state.

In some embodiments, when the first state is determined as the target state, the processing device 110 may determine the first confidence level of the first state as the confidence level of the target state. When the second state is determined as the target state, the processing device 110 may determine the second confidence level of the second state as the confidence level of the target state.

In some embodiments, the processing device 110 may adjust the first confidence level to obtain an adjusted first confidence level corresponding to the first state. The processing device 110 may determine, based on the adjusted first confidence level and the adjusted second confidence level, one of the first state and the second state as the target state of the target signal light in the first image. More descriptions regarding the adjustment of the first confidence level and the determining the target state of the target signal light based on the adjusted first confidence level and the adjusted second confidence level may be found elsewhere in the present disclosure, for example, FIG. 6.

In some embodiments, the processing device 110 may correct at least one the first state or the second state, and determine the target state of the target signal light at a time point when the first image is captured based on the corrected first confidence level and/or the corrected second first confidence level. For example, the processing device 110 may compare the corrected first confidence level and the corrected second confidence level corresponding to the first state and the second state, respectively. The processing device 110 may designate one of the first state and the second state whose corrected confidence level is larger as the target state. As another example, the processing device 110 may adjust the corrected first confidence level and the corrected second confidence level to obtain the adjusted first confidence level and the adjusted second confidence level, and determine, based on the adjusted first confidence level and the adjusted second confidence level, one of the first state and the second state as the target state of the target signal light in the first image. More descriptions regarding the correction of the first confidence level and the second confidence level may be found elsewhere in the present disclosure, for example, FIG. 7.

The first state may be obtained by using information such as space, color, etc. The second state may be obtained by using information in a time domain. Both the first state and the second state may be descriptions of the target state of the target signal light in the first image. Both the first state and the second state may have a probability of error. By fusing the first state and the second state, the processing device 110 may determine the target state of the target signal light at a time point when the first image is captured, which can improve the accuracy of the detection of the target signal light.

In some embodiments, when the signal light is detected based on a next frame of the first image, the first image may become the second image. The information such as the state of the target signal light detected based on the first image may become historical information for the next frame of the first image.

In some embodiments of the present disclosure, the processing device 110 may determine the target state of the target signal light at a time point when the first image is captured through the first state and the second state. The first state may be obtained by using information such as space, color, etc. The second state may be obtained by using information in a time domain. The first state and the second state may be state information obtained from different angles. The processing device 110 may determine the target state by not directly depending on the first state or the second state, but fusing the first state and the second state, which can reduce false detection and improve accuracy of the detection.

In some embodiments of the present disclosure, there may be no need to add a light filter, and the general electric police monitoring image acquisition device may be used without changing the overall brightness of the image or affecting the quality of the image, which can reduce the cost of hardware and manual debugging. In some embodiments of the present disclosure, the method is not limited by application scenarios and is applicable to a plurality of application scenarios.

In some embodiments, when the first state is determined as the target state, the processing device 110 may obtain, based on a first position of the target signal light in the first image, a target position of the target signal light in the first image. In some embodiments, when the second state is determined as the target state, the processing device 110 may determine, based on a second position of the target signal light in the second image, the target position of the target signal light in the first image. More descriptions regarding the first position and the second position may be found in relevant descriptions of FIG. 7.

In some embodiments, before adjusting the first confidence level corresponding to the first state, whether there is a reference position of the target signal light is determine. If there is the reference position of the target signal light, a first correction may be performed on the first confidence level based on a degree of deviation of the first position from the reference position, and the processing device 110 may update the first confidence level to the corrected first confidence level. More descriptions regarding the correcting the first confidence level may be found in relevant descriptions of FIG. 7.

In some embodiments, before obtaining an adjusted second confidence level corresponding to the second state, whether there is a reference position of the target signal light is determine. If there is the reference position of the target signal light, a second correction may be performed on the second confidence level based on a degree of deviation of the second position from the reference position, and the processing device 110 may update the second confidence level to a second corrected confidence level. More descriptions regarding correcting the second confidence level may be found in relevant descriptions of FIG. 7.

In some embodiments, the obtaining, based on the first position, the target position of the target signal light in the first image may include obtaining, based on the first position and the reference position, the target position of the target signal light in the first image if there is the reference position of the target signal light; or determining the first position as the target position of the target signal light in the first image if there is no reference position of the target signal light.

The obtaining, based on the second position, the target position of the target signal light in the first image may include obtaining, based on the second position and the reference position, the target position of the target signal light in the first image if there is the reference position of the target signal light; or determining the second position as the target position of the target signal light in the first image if there is no reference position of the target signal light.

In some embodiments, if there is the reference position of the target signal light, the processing device 110 may need to determine accuracy of the first position or the second position, and obtain the target position of the target signal light in the first image based on the first position and the reference position or based on the second position and the reference position. If there is no reference position of the target signal light, the processing device 110 may directly determine the first position or the second position as the target position of the target signal light in the first image.

In some embodiments, the obtaining, based on the first position and the reference position, the target position of the target signal light in the first image may include If the degree of deviation of the first position from the reference position is less than a first degree threshold, the first position may be determined as the target position of the target signal light in the first image, otherwise the reference position may be determined as the target position of the target signal light in the first image.

The obtaining, based on the second position and the reference position, the target position of the target signal light in the first image may include If the degree of deviation of the second position from the reference position is less than a second degree threshold, the second position may be determined as the target position of the target signal light in the first image, otherwise the reference position may be determined as the target position of the target signal light in the first image.

For example, when the degree of deviation of the first position from the reference position is less than the first degree threshold, an accuracy rate of the first position may be relatively high, and the first position may be directly determined as the target position of the target signal light in the first image. Otherwise, an accuracy rate of the first position may be relatively low, and the first position may be inaccurate. At this time, the reference position may be directly determined as the target position of the target signal light in the first image.

As another example, if the degree of deviation of the second position from the reference position is less than the second degree threshold, an accuracy rate of the second position may be relatively high, and the second position may be directly determined as the target position of the target signal light in the first image. Otherwise, the accuracy rate of the second position may be relatively low, and the second position may be inaccurate. At this time, the reference position may be directly determined as the target position of the target signal light in the first image.

That is, if the accuracy rate of the first position or the second position is low, the first position or the second position may be directly removed, and the reference position may be designated as the target position of the target signal light, thereby ensuring the detection accuracy of the target signal light.

After the first position is determined as the target position of the target signal light in the first image when the degree of deviation of the first position from the reference position is less than the first degree threshold, the method may also include updating, based on the first position, the reference position.

After the second position is determined as the target position of the target signal light in the first image when the degree of deviation of the second position from the reference position is less than the second degree threshold, the method may also include: updating, based on the second position, the reference position. More descriptions regarding the updating the reference position may be found in relevant descriptions of FIG. 8.

In some embodiments, if there is no reference position, after the target state of the target signal light in the first image is obtained, the reference position of the target signal light may be determined based on a historical position of the target signal light and the target position of the target signal light in the first image, and the reference position may be used for a next detection.

Specifically, the target position of the target signal light in the first image may be a final position of the target signal light in the first image.

When there is no reference position, after the target position of the target signal light in the first image is obtained, the reference position may be determined according to the final position of the target signal light that has been determined in the image.

It may be understood that when the signal light detection is performed on a next frame of the first image, a current position of the target signal light in the first image may become the historical position of the target signal light.

The process for determining the reference position may include: calculating an average value of the final positions of all the determined target signal lights in the image, or performing clustering processing on the final positions of the determined target signal lights in the image to obtain the reference position. The clustering process herein may adopt a mean shift clustering technology.

Before the reference position of the target signal light is obtained based on a historical position of the target signal light and the target position of the target signal light in the first image, the method may also include determining whether a count of historical positions of the target signal light reaches a count threshold. If a count of historical positions of the target signal light reaches the count threshold, the reference position of the target signal light may be obtained based on the historical position of the target signal light and the target position of the target signal light in the first image.

Specifically, the reference position may be generated only when the count of historical positions of the target signal light reaches the count threshold, otherwise the reference position may not be generated.

Figure 5:
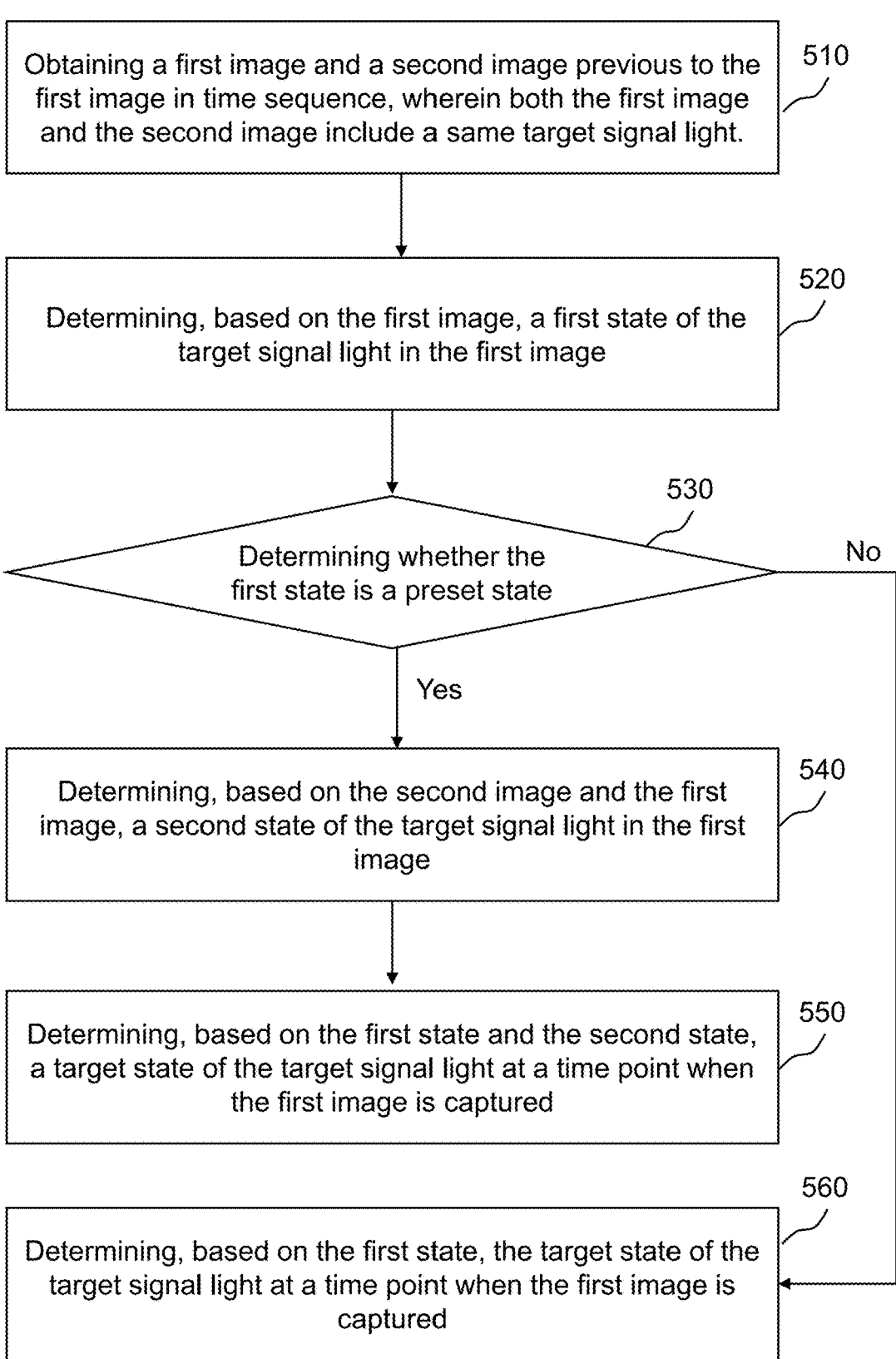
FIG. 5 is a flowchart illustrating an exemplary process for detecting another signal light according to some embodiments of the present disclosure.

FIG. 5 is a flowchart illustrating an exemplary process for detecting another signal light according to some embodiments of the present disclosure. As shown in FIG. 5, the process 500 may include the following operations. In some embodiments, the process 500 may be performed by the processing device 110.

In some embodiments, the first state of the target signal light may be free of a false detection. The false detection is a situation in which the state of the target signal light is prone to be identified incorrectly. Before determining the second state, the processing device 110 may determine whether the first state is the preset state.

In 510, a first image and a second image previous to the first image in time sequence may be obtained. Both the first image and the second image may include a same target signal light.

In 520, a first state of the target signal light in the first image may be determined based on the first image.

More descriptions regarding the operations 510 and 520 may be found in detailed descriptions of the operations 410 and 420 in FIG. 4.

In 530, whether the first state is a preset state may be determined.

The preset state may be a state where false detection is prone to occur. For example, the preset state may be a red light state, a yellow light state, etc. As another example, the preset state may be a light-on state (e.g., any state of a red light state, a green light state, or a yellow light state).

In response to a determination that the first state is the preset state, the processing device 110 may execute operation 540 to operation 550. In response to a determination that the first state is not the preset state, the processing device 110 may execute operation 560. More descriptions regarding the operation 540 and the operation 550 may be found in detailed descriptions of the operation 430 and the operation 440 in FIG. 4.

In some embodiments, the processing device 110 may determine whether the first state is the preset state. For example, the processing device 110 may set the preset state to be a red light state, a yellow light state, etc. The processing device 110 may compare the determined first state with the preset state, and then determine whether the first state is the preset state. For example, the first state of the target signal light identified in the operation 520 in the first image may be a red light state. The red light state may be the preset state. The processing device 110 may execute the operation 540 to the operation 550. In 540, the processing device 110 may determine a second state of the target signal light in the first image based on the first image and the second image. In 50, the processing device 110 may determine the target state of the target signal light at a time point when the first image is captured based on the first state and the second state. More descriptions regarding the operations 540 and 550 may be found in detailed descriptions of the operations 430 and 440 in FIG. 4.

In order to avoid confusion between yellow light and red light, the processing device 110 may continue to determine the target state of the target signal light at a time point when the first image is captured based on the first state and the second state.

In 560, the target state of the target signal light at a time point when the first image is captured may be determined based on the first state.

In some embodiments, the processing device 110 may determine the first state as the target state of the target signal light at the time point when the first image is captured. For example, the first state of the target signal light identified in the operation 520 obtained by the processing device 110 in the first image may be a light-off state. The light-off state is not a preset state. The processing device 110 may determine the first state (e.g., the light-off state) as the target state of the target signal light at the time point when the first image is captured.

FIG. 6 is a flowchart illustrating an exemplary process for determining a target state based on a first confidence level and a second confidence level according to some embodiments of the present disclosure. As shown in FIG. 6, the process 600 may include the following operations. In some embodiments, the process 600 may be performed by the processing device 110.

In 610, an adjusted first confidence level corresponding to the first state may be obtained by adjusting the first confidence level.

In some embodiments, the processing device 110 may obtain the adjusted first confidence level corresponding to the first state by adjusting the first confidence level according to a preset strategy. In some embodiments, the first confidence level may be a corrected first confidence level.

More descriptions regarding the corrected first confidence level may be found in FIG. 7.

In some embodiments, the processing device 110 may determine a product of the first confidence level and a preset first factor as the adjusted first confidence level.

The preset first factor may refer to an attenuation factor of the first confidence level. In some embodiments, the preset first factor may be a real value between 0 and 1. The larger the value is, the more credible the first confidence level may be. In some embodiments, the preset first factor may be set according to an actual need. For example, the preset first factor may be determined according to historical data. For example, during a certain time period, if the accuracy rate of the first state is relatively high (e.g., if the accuracy rate is greater than 95% or a probability that the first state of the signal light detected according to the first machine learning model is determined to be the target state of the signal light may exceed a certain threshold), the processing device 110 may set the preset first factor to be relatively large, for example, the preset first factor may be 0.9, 1, etc. During the certain time period, if the accuracy rate of the first state is relatively low (e.g., if the accuracy rate is less than 80% or a probability that the first state of the signal light detected according to the first machine learning model is determined to be the target state of the signal light may be less than a certain threshold), the processing device 110 may set the preset first factor to be relatively small, for example, the preset first factor may be 0.8, 0.6, etc. In some embodiments, the preset first factor may also reflect the accuracy of the trained first machine learning model for determining the first state. The greater the accuracy of the trained first machine learning model is, the greater the preset first factor may be.

In some embodiments, the processing device 110 may determine the adjusted first confidence level according to following equation (4):

$$conf_1 = conf_{det}, \qquad (4)$$

where $conf_1$ denotes the adjusted of the first confidence level, $conf_{det}$ denotes the first confidence level, and a denotes the preset first factor (e.g., 0.9, etc.).

In some embodiments, when the first state is finally determined as the target state, the processing device 110 may determine the first confidence level as the confidence level of the target state. In some embodiments, after the adjusted first confidence level $conf_1$ is obtained, if the first state is finally determined as the target state, the processing device 110 may restore the confidence level of the adjusted first confidence level, and determine a result of $$\frac{conf_1}{\alpha}$$

(i.e., a first continence level $conf_{det}$) to be the confidence level of the target state.

In some embodiments of the present disclosure, the processing device 110 may determine the product of the first confidence level and the preset first factor as the adjusted first confidence level, which can improve the accuracy of the confidence level corresponding to the first state, thereby improving the accuracy of the determined target state.

In 620, an adjusted second confidence level corresponding to the second state may be obtained based on a confidence level of a state change or by adjusting the second confidence level. In some embodiments, the second confidence level may be a corrected second confidence level. More descriptions regarding the corrected second confidence level may be found in FIG. 7.

In some embodiments, the processing device 110 may determine, based on a state change, a determination mode corresponding to one of the second confidence level and the adjusted second confidence level. The processing device 110 may determine, based on a confidence level of a target state corresponding to the target signal light at a time point when the second image is captured, the confidence level corresponding to the state change, and the determination mode, the second confidence level or the adjusted second confidence level.

The state change may include off to on (referred to as light on), color change (referred to as light changed), no color change (referred to as light unchanged), from on to off (referred to as light unchanged), etc. More descriptions regarding the state change may be found in relevant descriptions of FIG. 4. Based on different state changes, the determination of the second letter is different.

In some embodiments, if the state change is that a color of the target signal light does not change from the time point when the second image is acquired to the time point when the first image is acquired (i.e., light unchanged, and the target state of the target signal light at the time point when the second image is captured may be the light-on state), the processing device 110 may determine a product of the confidence level of the target state corresponding to the target signal light at the time point when the second image is captured, the confidence level corresponding to the state change, and a preset second factor as the adjusted second confidence level. In some embodiments, the processing device 110 may determine a product of the confidence level of the target state corresponding to the target signal light at the time point when the second image is captured and the confidence level corresponding to the state change as the second confidence level of the second state. The processing device 110 may obtain the adjusted second confidence level by adjusting the second confidence level based on the preset second factor.

The preset second factor may refer to an attenuation factor of the confidence level corresponding to the state change or the second confidence level. In some embodiments, the preset second factor may be an attenuation factor of the confidence level output by the second machine learning model. A mode for determining the preset second factor may be similar to or the same as a mode for determining the preset first factor. More descriptions regarding the preset second factor may be found in relevant descriptions of the preset first factor. In some embodiments, the preset second factor may also reflect the accuracy of the trained second machine learning model for determining the second state or the state change. The greater the accuracy of the trained second machine learning model is, the greater the preset second factor may be.

For example, the processing device 110 may determine the adjusted second confidence level by Equation (5):

$$conf_2 = conf_{pre} * conf_{uch} * \beta, \tag{5}$$

where $conf_2$ denotes the adjusted second confidence level, $conf_{pre}$ denotes the confidence level of the target state corresponding to the target signal light at the time point when the second image is captured, $conf_{uch}$ denotes the confidence level corresponding to the state change (that is, the state change is a confidence level that a color of the target signal light changes), $\beta$ denotes the preset second factor (e.g., 0.8, 0.5, etc.).

In some embodiments, if the state change is that a color of the target signal light changes from the time point when the second image is acquired to the time point when the first image is acquired (i.e., light change, and the target state of the target signal light at the time point when the second image is captured may be the light-on state), the processing device 110 may determine an average value of the confidence level corresponding to the state change and the confidence level of the target state corresponding to the target signal light at the time point when the second image is captured as the adjusted second confidence level. In some embodiments, the processing device 110 may determine a product of a preset second factor and the sum of the confidence level of the target state corresponding to the target signal light at the time point when the second image is captured and the confidence level corresponding to the state change as the adjusted second confidence level and the preset second factor may be equal to 0.5. In some embodiments, the processing device 110 may determine a sum of the confidence level of the target state corresponding to the target signal light at the time point when the second image is captured and the confidence level corresponding to the state change as the second confidence level of the second state. The processing device 110 may obtain the adjusted second confidence level by adjusting the second confidence level based on the preset second factor.

For example, the processing device 110 may determine the adjusted second confidence level according to Equation (6):

$$conf_2 = \frac{\left( conf_{pre} + conf_{ch} \right)}{2}, \tag{6}$$

where $conf_2$ denotes the adjusted second confidence level, $conf_{pre}$ denotes the confidence level of the target state corresponding to the target signal light at the time point when the second image is captured, $conf_{ch}$ denotes the confidence level corresponding to the state change (that is, the state change is a confidence level that a color of the target signal light changes).

In some embodiments, if the light is on (i.e., light being on and, the target state of the target signal light at the time point when the second image is captured is the light-off state) or when the light is off (i.e., light being off, and the target state of the target signal light at the time point when the second image is captured is the light-on state), the processing device 110 may determine the confidence level corresponding to the state change as the adjusted second confidence level or the second confidence level. In some embodiments, the preset second factor may be equal to 1.

For example, the processing device 110 may determine the adjusted second confidence level according to Equation (7):

$$conf_2 = conf_{lgt}, \tag{7}$$

where $conf_2$ denotes the adjusted second confidence level, $conf_{lgt}$ denotes the confidence level corresponding to the state change.

In some embodiments, if the second state is finally determined as the target state, the processing device 110 may determine the adjusted second confidence level as the confidence level of the target state, that is, the processing device 110 may determine $conf_2$ as the confidence level of the target state.

In some embodiments, the confidence level corresponding to the state change may be the state change of the target signal light from the time point when the second image is captured to the time point when the first image is captured, and the confidence level of the state change may be estimated based on the first image and the second image. The higher the confidence level, the higher the probability that the state change of the target signal light from the second image to the first image is the state change.

After obtaining the confidence level corresponding to the state change, the processing device 110 may convert the confidence level of the state change into the adjusted second confidence level according to a preset strategy. For example, if the state change is obtained by using the trained second machine learning model, the confidence level of the state change may be the confidence level output by the second machine learning model.

In some embodiments of the present disclosure, the processing device 110 may determine, based on the state change, a determination mode corresponding to one of the second confidence level and the adjusted second confidence level. The processing device 110 may determine, based on different determination modes corresponding to different state changes, the adjusted second confidence level, which can improve the accuracy of the confidence level corresponding to the second state, thereby improving the accuracy of the determined target state.

In 630, one of the first state and the second state may be determined as the target state of the target signal light at a time point when the first image is captured based on the adjusted first confidence level and one of the second confidence level and the adjusted second confidence level.

In some embodiments, the first confidence level may be positively correlated with the adjusted first confidence level. The second confidence level may be positively correlated with the adjusted second confidence level. The processing device 110 may compare the adjusted first confidence level and the adjusted second confidence level. If the adjusted first confidence level is greater than the adjusted second confidence level, the first state may be determined as the target state of the target signal light at the time point when the first image is captured. If the adjusted first confidence level is less than the adjusted second confidence level, the second state may be determined as the target state of the target signal light at the time point when the first image is captured. If the adjusted first confidence level is equal to the adjusted second confidence level, the first state or the second state may be determined as the target state of the target signal light at the time point when the first image is captured. For example, if the adjusted first confidence level is 0.8, and the adjusted second confidence level is 0.6, the processing device 110 may determine the first state corresponding to the adjusted first confidence level as the target state of the target signal light at the time point when the first image is captured.

In some embodiments, the first confidence level may be negatively correlated with the adjusted first confidence level. The second confidence level may be negatively correlated with the adjusted second confidence level. The processing device 110 may compare the adjusted first confidence level and the adjusted second confidence level. If the adjusted first confidence level is greater than the adjusted second confidence level, the second state may be determined as the target state of the target signal light at the time point when the first image is captured. If the adjusted first confidence level is less than the adjusted second confidence level, the first state may be determined as the target state of the target signal light at the time point when the first image is captured. If the adjusted first confidence level is equal to the adjusted second confidence level, the first state or the second state may be determined as the target state of the target signal light at the time point when the first image is captured.

In some embodiments of the present disclosure, the target state of the target signal light at the time point when the first image is captured may be determined based on the adjusted first confidence level and one of the second confidence level and the adjusted second confidence level, which can improve the accuracy of the determined target state.

FIG. 7 is a flowchart illustrating an exemplary process for correcting a first confidence level or a second confidence level according to some embodiments of the present disclosure. As shown in FIG. 7, in some embodiments, the process 700 may include the operation 710, the operation 720 and the operation 730. In some embodiments, the process 700 may be performed by the processing device 110.

In 710, a reference position of a target signal light may be obtained. The reference position may be a desired or ideal position of the target signal light in a first image and a second image. In some embodiments, the processing device 110 may obtain the reference position of the target signal light in the first image and the second image (for example, reference coordinates or a reference box of the target signal light in the first image and the second image) from a storage device.

In some embodiments, the reference position may be determined based on a position of the target signal light in a world coordinate system and a conversion relationship between a coordinate system n of an image acquisition device acquiring the first image and the second image and the world coordinate system. The conversion relationship between the coordinate system of the image acquisition device and the world coordinate system may be represented by internal and external parameters of the image acquisition device. The conversion relationship between the coordinate system of the image acquisition device and the world coordinate system and the position of the target signal light in the world coordinate system may be a default setting of the system 100.

In some embodiments, the reference position may be determined based on the position of the target signal light in a plurality of sample images (that is, a sample set) captured by the monitoring image acquisition device in a preset historical time period. For example, a sample set may be obtained. A clustering result may be obtained based on a clustering algorithm by clustering the positions of the target signal light in the plurality of sample images in the sample set. The reference position may be determined based on the clustering result. More descriptions regarding the determining the reference position of the target signal light based on the sample set may be found in detailed descriptions in FIG. 8.

In some embodiments, the processing device 110 may locate the target signal light from the first image and the second image to obtain the first position and the second position of the target signal light in the first image. For example, when determining the first state of the target signal light in the first image, the processing device 110 may also obtain the first position of the target signal light in the first image. While determining the second state of the target signal light in the first image, the processing device 110 may also obtain the second position of the target signal light in the first image. Both the first position and the second position may be descriptions of the position of the target signal light in the first image. The first position and the second position may be represented by positions of detection boxes (an identification box enclosing the target signal light), e.g., coordinates of a point of each of the detection boxes.

In 720, the processing device 110 may determine whether the first confidence level and the second confidence level or the confidence level of the sate change need to be corrected based on the reference position.

In some embodiments, the operation 720 may include at least one the operation step 721 or the operation 722.

In 721, whether the first confidence level needs to be corrected may be determined based on the first position of the target signal light in the first image and the reference position.

In some embodiments, the processing device 110 may obtain the first position through a trained first machine learning model. For example, the trained first machine learning model may output the first position. More descriptions regarding the first machine learning model may be found in relevant descriptions of FIG. 4.

The processing device 110 may obtain a first comparison result by comparing the first position and the reference position. The first comparison result may indicate a degree of deviation of the first position from the reference position. The degree of deviation of the first position from the reference position may indicate an accuracy rate of the first state. The farther the first position is from the reference position, the lower the possibility that the target state of the target signal light in the first image is the first state (that is, the lower the accuracy rate of the first state). In some embodiments, the first comparison result may be represented by an intersection-over-union between the first position and the reference position. The larger the value of the intersection-over-union, the smaller the degree of deviation of the first position from the reference position. When the intersection-over-union is 1, it means that the first position completely coincides with or is the same as the reference position.

In some embodiments, the processing device 110 may determine, based on the first comparison result, whether the first confidence level needs to be corrected. For example, the processing device 110 may set a first threshold for the first comparison result. When the degree of deviation of the first position from the reference position exceeds the first threshold, the processing device 110 may correct the first confidence level of the first state; otherwise no correction may be performed.

In 722, whether the second confidence level or the confidence level of the sate change needs to be corrected may be determined based on the second position of the target signal light in the first image and the reference position.

In some embodiments, the processing device 110 may obtain the second position from the first image through a trained second machine learning model. For example, the trained second machine learning model may output the second position. More descriptions regarding the second machine learning model may be found in relevant descriptions of FIG. 4.

The processing device 110 may obtain a second comparison result by comparing the second position and the reference position. The second comparison result may refer to a degree of deviation of the second position from the reference position. The degree of deviation of the second position from the reference position may indicate a probability that the target state of the target signal light in the first image is the second state. The farther the second position is from the reference position, the lower the possibility that the target state of the target signal light in the first image is the second state (that is, the lower an accuracy rate of the second state). In some embodiments, the second comparison result may be represented by an intersection-over-union between the second position and the reference position. The larger the value of the intersection-over-union, the smaller the degree of deviation of the second position from the reference position. When the intersection-over-union is 1, it means that the second position completely coincides with or is the same as the reference position. In some embodiments, the processing device 110 may determine whether there is the reference position of the target signal light. If there is the reference position of the target signal light, the processing device 110 may determine the second comparison result by comparing the second position and the reference position.

In some embodiments, the processing device 110 may determine, based on the second comparison result, whether the second confidence level or the confidence level of the sate change needs to be corrected. For example, the processing device 110 may set a second threshold of the second comparison result. When the degree of deviation of the second position from the reference position exceeds the second threshold of the second comparison result, the processing device 110 may correct the second confidence level of the second state or the confidence level of the sate change; otherwise no correction may be performed. The first threshold may be the same as or different from the second threshold.

According to some embodiments of the present disclosure, the processing device 110 may determine whether the first confidence level, or the second confidence level, or the confidence level of the sate change needs to be corrected by comparing the first position or the second position and the reference position, so as to ensure the accuracy of the first confidence level, the second confidence level, and/or the confidence level of the sate change.

In 730, in response to a determination that the first confidence level and/or the second confidence level needs to be corrected, the processing device 110 may correct the first confidence level and/or the second confidence level based on the intersection-over-union between the first position and/or the second position and the reference position.

In some embodiments, operation 730 may include at least one the operation 731 or the operation 732.

In 731, in response to a determination that the first confidence level needs to be corrected, the first confidence level may be corrected based on the intersection-over-union between the first position and the reference position.

In some embodiments, the processing device 110 may correct the first confidence level according to the following Equation (8):

$$conf_m = conf_n * \cos(1 - iou), \tag{8}$$

where $conf_n$ denotes a first confidence level before correction, $conf_m$ denotes a corrected first confidence level, iou denotes the intersection-over-union between the first position and the reference position.

In some embodiments, if the first confidence level is corrected, the processing device 110 may update the first confidence level using the first corrected confidence level, and then operation 610 may be executed. Subsequently, when the first state is determined as the target state, since the first confidence level has been corrected, the processing device 110 may determine the corrected first confidence level as the confidence level of the target state.

In some embodiments of the present disclosure, in response to a determination that the first confidence level needs to be corrected, the first confidence level may be corrected based on the intersection-over-union between the first position and the reference position, which can improve the accuracy of the first confidence level.

In 732, in response to a determination that the second confidence level or the confidence level of the sate change needs to be corrected, the second confidence level or the confidence level of the sate change may be corrected based on the intersection-over-union between the second position and the reference position.

In some embodiments, the processing device 110 may correct the second confidence level or the confidence level of the sate change according to the following Equation (9):

$$conf_p = conf_q * \cos(1 - iou), \qquad (9)$$

where, $conf_q$ denotes a second confidence level or the confidence level of the sate change before correction, $conf_p$ denotes a corrected second confidence level or the corrected confidence level of the sate change, iou denotes the intersection-over-union between the second position and the reference position.

In some embodiments, if the second confidence level is corrected, the processing device 110 may update the second confidence level to the second corrected confidence level, and then the operation 620 may be executed.

Subsequently, when the second state is determined as the target state, since the second confidence level has been corrected, the processing device 110 may determine the corrected second confidence level or the adjusted second confidence level by adjusting the corrected second confidence level as the confidence level of the target state.

In some embodiments, when there is no reference position of the target signal light, the processing device 110 may not need to correct the first confidence level of the first state and the second confidence level of the second state.

In some embodiments, the processing device 110 may correct the first confidence level only when the degree of deviation of the first position from the reference position exceeds the first threshold, otherwise, no correction may be performed. Alternatively, the processing device 110 may correct the second confidence level only when the degree of deviation of the second position from the reference position exceeds the set threshold, otherwise, no correction may be performed.

In some embodiments, the processing device 110 may only correct one of the first confidence level and the second confidence level, and not correct the other.

In some embodiments of the present disclosure, in response to a determination that the second confidence level or the confidence level of the sate change needs to be corrected, the second confidence level or the confidence level of the sate change may be corrected based on an intersection-over-union between the second position and the reference position, which can improve the accuracy of the second confidence level.

FIG. 8 is a flowchart illustrating an exemplary process for obtaining a reference position according to some embodiments of the present disclosure. As shown in FIG. 8, in some embodiments, process 800 may include the operation 810, the operation 820, and the operation 830. In some embodiments, the process 800 may be performed by the processing device 110.

In 810, a sample set may be obtained.

In some embodiments, the sample set may include positions of a target signal light in a plurality of sample images captured within a preset time period. In some embodiments, the sample set may include positions of each of a plurality of target signal lights in the plurality of sample images captured within a preset time period. In some embodiments, the preset time period may be before a time point when the second image is captured. In some embodiments, the preset time period may include a time point when the second image is captured.

In some embodiments, the preset time period may include one change period of the target signal light. For example, in the change period, a signal light logic may be performed for one time. In other words, the change period may also be referred to as a period of the signal light logic. As a further example, the change period may refer to time required for the target signal light to change from green to yellow, from yellow to red, and from red to green again. A time period from a time point when the target signal light turns green to a time point when the target signal light turns green again may be the preset time period. In some embodiments, the preset time period may be before a time point when the second image is captured. The plurality of sample images may be images captured before the second image.

In some embodiments, the processing device 110 may obtain the sample image through the image acquisition device monitoring the target signal light. For example, the processing device 110 may obtain the plurality of sample images acquired by the image acquisition device, in the change period of the target signal light before the time point when the second image is captured. The processing device 110 may identify and mark the positions of the target signal light in the plurality of sample images. For example, the processing device 110 may mark the position of the target signal light using a detection box. The detection box may be an identification box enclosing the target signal light. The detection box may include the target signal light. As another example, the processing device 110 may mark the position of the target signal light using coordinates. The position of the target signal light may be denoted by the coordinates.

In 820, a clustering result may be obtained by clustering the positions of the target signal light in the sample set based on a clustering algorithm.

The clustering result may include one or more cluster sets. Each of the plurality of cluster sets may include corresponding to one of the plurality of target signal lights. Each of the plurality of cluster sets may include one or more positions of one of the plurality of target signal lights.

Exemplary clustering algorithms may include a mean clustering algorithm (e.g., a K-means clustering algorithm, a fuzzy c-means clustering algorithm, etc.), a mean shift clustering algorithm, a density-based spatial clustering of applications with noise (DBSCAN), etc. For example, the processing device 110 may cluster the detection boxes or coordinates corresponding to the target signal light using the mean clustering algorithm to obtain the cluster result.

More description regarding the processing device 110 obtaining the clustering result by the mean clustering algorithm based on the sample set may be found in relevant descriptions of the FIG. 8.

In 830, the reference position may be determined based on the clustering result.

Different target signal lights may correspond to different reference positions.

In some embodiments, the processing device 110 may determine the cluster center in one of the one or more cluster sets in the clustering result as the reference position of the target signal light. For example, one of the one or more cluster sets in the clustering result may include one or more positions of the target signal light. The one or more positions may be denoted by one or more detection boxes. The processing device 110 may merge the one or more detection boxes and determine a merged detection box. The processing device 110 may designate the position of the center of the merged detection box as the reference box. In some embodiments, the processing device 110 may determine an average position of the one or more detection boxes as the reference position. For example, the processing device 110 may obtain coordinates of vertexes of each of the one or more detection boxes. The processing device 110 may determine the average position of the one or more detection boxes by averaging coordinates of the same vertexes of the one or more detection boxes.

In some embodiments of the present disclosure, the processing device 110 may determine the reference position through the cluster algorithm, which can improve the accuracy of the reference position, thereby improving the accuracy of the determined target state.

In some embodiments, the sample set and the reference position may be updated based on the first position and/or the second position of the target signal light.

In some embodiments, when the accuracy of the first position is relatively high, after determining the first position as the target position of the target signal light, the processing device 110 may update the sample set and the reference position based on the first position. For example, the processing device 110 may determine the reference position based on the updated sample including the first position of the target signal light. When the accuracy of the second position is relatively high, after determining the second position as the target position of the target signal light, the processing device 110 may update the sample set and the reference position with the second position. The processing device 110 may determine the accuracy of the first position or the second position according to the reference position. For example, the processing device 110 may obtain an intersection-over-union between the reference position and one of the first position and the second position and the accuracy of one of the first position and the second position with a larger intersection-over-union may be higher. More descriptions regarding the first position and the second position may be found in detailed descriptions in FIG. 7.

In some embodiments, the processing device 110 may update the reference position according to the following Equation (10):

$$cbbox = \frac{cbbox * qt + dbbox}{qt + 1},$$  (10)

where dbbox denotes coordinates of the first position or coordinates of the second position, qt denotes a count of times the reference position is determined, cbbox denotes coordinates of the reference location. When the reference position is updated each time, the count of times the reference position is calculated may be incremented by one.

In some embodiments, the processing device 110 may mark the position of the target signal light in a newly obtained sample image. Through the above method, the processing device 110 may update the sample set.

Figure 9:
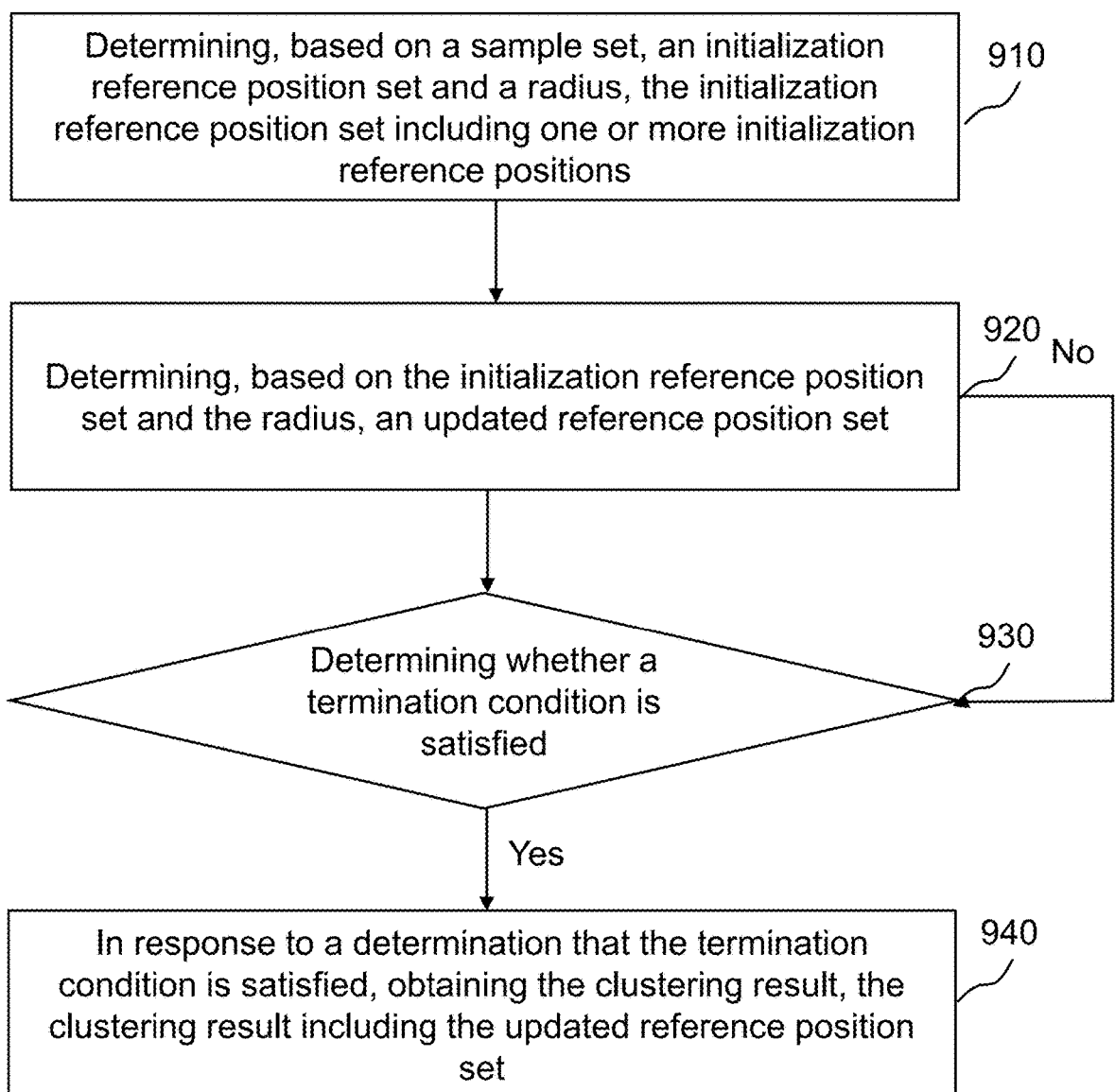
FIG. 9 is a flowchart illustrating an exemplary process for obtaining a clustering result according to some embodiments of the present disclosure.

FIG. 9 is a flowchart illustrating an exemplary process for obtaining a clustering result according to some embodiments of the present disclosure. As shown in FIG. 9, the process 900 may include the following operations. In some embodiments, the process 900 may be performed by the processing device 110. The clustering result of a sample set including a plurality of positions of one or more target signal lights represented in a plurality of sample images may be obtained according to a mean clustering algorithm as described in FIG. 9. Using the mean clustering algorithm, an iteration process including a plurality of iterations may be performed. For illustration, one of the plurality of iterations may be described as follows.

In 910, an initialization reference position set and a radius may be determined based on the sample set. The initialization reference position set may include one or more initialization reference positions.

The radius may be used to determine a region range for each of the one or more initialization reference positions. For example, the region range may include a circle region with the radius and centered on an initialization reference position in the initialization reference position set.

In some embodiments, the processing device 110 may determine the initialization reference position set and the radius based on the sample set. For example, the processing device 110 may obtain the initialization position set by sampling in the sample set (e.g., interval sampling, e.g., uniformly-space sampling or unequal sampling). Positions sampled by the processing device 110 may be designated as the initialization reference positions in the initialization reference position set. As another example, the processing device 110 may preset the initialization reference position set and the radius according to an actual need.

In 920, an updated reference position set may be determined based on the initialization reference position set and the radius.

In some embodiments, based on the initialization reference position set and the radius, the processing device 110 may determine positions in the sample sets (e.g., a plurality of detection boxes or coordinates) within the radius of an initialization reference position in the initialization reference position set and the positions in the sample sets within the radius of the initialization reference position may form an updated reference position set. The (also referred to as one cluster or reference position cluster M). For each of the one or more initialization reference positions in the initialization reference position set, the processing device 110 may determine a reference position cluster M and then obtain one or more reference position clusters M.

The processing device 110 may determine a mean position of positions in each of the one or more reference position clusters M and the mean position corresponding to each of the one or more reference position clusters M may form reference positions in the updated reference position set.

In some embodiments, the processing device 110 may merge reference positions or remove one of the reference positions, in the updated reference position set, whose distances are less than a distance threshold to determine or update the updated reference position set again to obtain the updated reference position set. In some embodiments, the distance threshold may be an average value of the distance between the updated reference positions. In some embodiments, the distance threshold may be a default setting of the system 100. When the distance between two reference positions in the updated reference position set is less than the distance threshold, the two reference positions may be merged into one or remove. The merging of two reference positions may include determining a mean position between the two reference positions or combine the two reference positions.

In 930, whether a termination condition is satisfied may be determined.

The termination condition may be a stop condition of the iteration process. For example, the termination condition may be that a count of iterations (e.g., 20 times, etc.) is performed, a convergence is reached, etc. In some embodiments, the termination condition may be that a fluctuation of each of the updated reference positions in the updated reference position set is less than or equal to a fluctuation threshold. The fluctuation threshold may refer to a minimum value of a change between a current updated reference position and a last updated reference position in the iterative process. In response to determining that the termination condition is satisfied, the processing device 110 may terminate the iteration process and proceed to operation 940. In response to determining that the termination condition is not satisfied, the processing device 110 may perform operation 950 and then continue to repeat operation 920 and operation 930. In operation 950, the updated reference position set may be designated as the initialization reference position in operation 920.

In 940, the clustering result may be obtained in response to a determination that the termination condition is satisfied. The clustering result may include the updated reference position set.

For example, the clustering result may be the updated reference position set generated in the last iteration. The updated reference position set may include reference positions corresponding to different target signal lights. In some embodiments, the processing device 110 may obtain the clustering result by removing an isolated reference position in the updated reference position set. In some embodiments, the processing device 110 may merge or remove one of two reference positions whose distance is less than a distance threshold to obtain the clustering result.

In some embodiments of the present disclosure, the reference position of the target signal light may be determined by using the mean clustering algorithm. These information may be used as a priori to help correct the confidence level of the first state or the second state output by the first machine learning model or the second machine learning model, which can improve the detection accuracy.

It should be noted that the above description is intended to be illustrative, and not to limit the scope of the present disclosure. For those skilled in the art, various variations and modifications can be made under the guidance of the present disclosure. However, those variations and modifications do not depart from the scope of the present disclosure.

FIG. 10 is a schematic diagram illustrating an exemplary process for detecting a state of a signal light according to some embodiments of the present disclosure.

In some embodiments, the processing device 110 may input the first image or the pre-processed first image into the trained first machine learning model, and the trained first machine learning model may output the first state (multi-dimensional matrix).

In some embodiments, the processing device 110 may input the first image and the second image into the trained second machine learning model, and the trained second machine learning model may output the state change.

In some embodiments, the output of the trained second machine learning model may include the state change and a confidence level of the state change. The processing device 110 may determine the second state based on the state change and the historical state of the second image. For example, when the state change is that color has not changed, and the historical state of the second image is a yellow light state, the processing device 110 may determine the second state as a yellow light state. In some embodiments, the processing device 110 may determine the second confidence level of the second state based on the confidence level of the state change. More descriptions for determining the second confidence level of the second state based on the confidence level of the state change may be found in FIG. 6 and the descriptions thereof.

In some embodiments, the processing device 110 may compare the first state and the second state. When the first state is the same as the second state, the processing device 110 may determine the first state or the second state as the target state. When the first state is different from the second state, the processing device 110 may determine one of the first state and the second state as the target state.

FIG. 11 is a block diagram illustrating an exemplary processing device for detecting a state of a signal light according to some embodiments of the present disclosure. As shown in FIG. 11, a device for detecting a signal light 1100 may include an obtaining module 1110 (which may be referred to as an image obtaining module module), a first state determination module 1120 (which may be referred to as a first dentification module), a second state determination module 1130 (which may be referred to as a second dentification module or a state prediction module), and a target state determination module 1140 (which may be referred to as a current state module).

In some embodiments, the obtaining module 1110 may be configured to obtain a first image and a second image previous to the first image in time sequence. Both the first image and the second image may include a same target signal light.

In some embodiments, the first state determination module 1120 connected with the obtaining module 1110 may be configured to determine, based on the first image, a first state of the target signal light in the first image.

In some embodiments, the second state determination module 1130 connected with the obtaining module 1110 may be configured to determine, based on the second image and the first image, a second state of the target signal light in the first image.

In some embodiments, the target state determination module 1140 may be configured to determine, based on the first state and the second state, a target state of the target signal light at a time point when the first image is captured.

In some embodiments, the target state determination module 1140 connected with the second state determination module 1130 and the obtaining module 1110 may be configured to determining a state change of the target signal light from a time point when the second image is captured to a time point when the first image is captured by processing the second image and the first image based on the trained second neural network model. In some embodiments, the target state determination module 1140 may be configured to determine, based on a target state of the target signal light at a time point when the second image is captured and the state change, the second state of the target signal light in the first image.

In some embodiments, the device for detecting a signal light 1100 may be any device with image processing capacity, such as a computer, a mobile phone, etc., where will not be limited herein.

In some embodiments, the obtaining module 1110, the first state determination module 1120, the second state determination module 1130, and the target state determination module 1140 in the device for detecting a signal light 1100 may cooperate with each other to execute the operations in the method for detecting a signal light in any of the above embodiments. Detailed operations may be found in the above embodiments, which will not be repeated herein.

Figure 12:
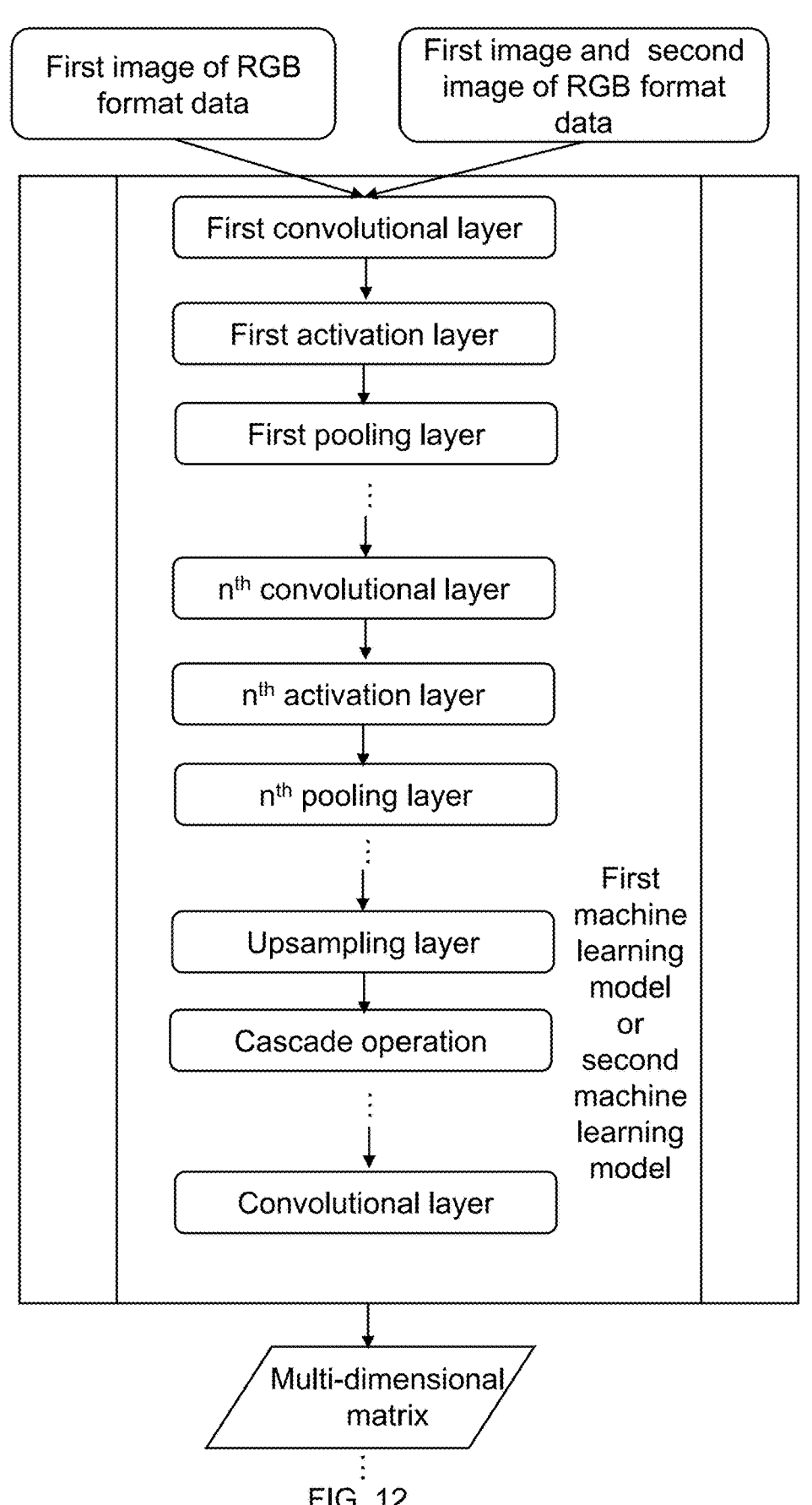
FIG. 12 is a schematic diagram illustrating an exemplary first or second machine learning model according to some embodiments of the present disclosure.

FIG. 12 is a schematic diagram illustrating an exemplary first or second machine learning model according to some embodiments of the present disclosure. As shown in FIG. 12, the processing device 110 may input a first image of RGB format data into a trained first machine learning model for processing. In some embodiments, the processing device 110 may input the first image and the second image of the RGB format data to a trained second machine learning model for processing. The processing device 110 may input the first image into the first machine learning model. The first machine learning model may output a multi-dimensional matrix. Each element in the multi-dimensional matrix may represent whether a pixel corresponding to the each element represents a portion of the target signal light, the state corresponding to the portion of the target signal light (e.g., a first state, etc.) denoted by the pixel, and a confidence level of the state corresponding to the portion of the target signal light denoted by the pixel, etc. The processing device 110 may perform channel merging of the first image and the second image as input to the second machine learning model. The second machine learning model may output a multi-dimensional matrix. In some embodiments, the second multi-dimensional matrix may represent state changes of different positions of the target signal light in the first image, confidence levels of the state change corresponding to different positions of the target signal lights, etc. More descriptions regarding the multi-dimensional matrix, may be found in relevant descriptions of FIG. 4. As shown in FIG. 12, at least one of the first machine learning model or the second machine learning model may include structural layers such as a first convolutional layer, a first activation layer, a first pooling layer, . . . , a $n^{th}$ convolutional layer, a $n^{th}$ activation layer, a $n^{th}$ pooling layer, . . . , an upsampling layer, a cascade operation layer, . . . , a convolutional layer.

In some embodiments, the $n^{th}$ convolutional layer may perform an operation according to Equation (11):

$$F_n = \sum\nolimits_c (F_{n-1} \otimes w_n) + b_n, \tag{11}$$

where the $n^{th}$ convolutional layer performs a convolution and an addition operation of an input $F_{n-1}$ using a convolution kernel, $\otimes$ denotes a convolution operation, $F_{n-1}$ denotes the output of a $n-1^{th}$ layer, $w_n$ denotes a $n^{th}$ layer convolution kernel, $b_n$ denotes a bias term for the $n^{th}$ layer, $F_n$ denotes a $n^{th}$ layer output, c denotes a count of channels of $F_{n-1}$ and $w_n$. A count of channels of $F_n$ may be related to a count of $w_n$.

In some embodiments, taking $F_n$ as an input, the $n^{th}$ activation layer may map each value of the input as Equation (12) as follows:

$$F_{n\_act} = \begin{cases} F_n, & F_n \geq 0 \\ \alpha * F_n, & \text{other} \end{cases}, \tag{12}$$

where, $\alpha$ denotes an attenuation coefficient, which may control a case that $F_n$ is less than 0, $F_{n\_act}$ denotes the output of the activation layer.

In some embodiments, the pooling layer may downsample input features, select sampling areas at equal intervals, and calculate a maximum value or an average value as the output of the corresponding position. The input feature may be represented as a matrix. The matrix may be divided into a plurality of regions to calculate the maximum value or the average value of elements in each region. It may be assumed that a size of the input feature is $(W_n, H_n, C_n)$, and a size of the output feature after being processed by a downsampling layer is $(W_n/N, H_n/N, C_n)$, where N denotes a downsampling multiple.

In some embodiments, the upsampling layer may perform an upsampling operation by using a bilinear interpolation method. It may be assumed that a size of the input feature is $(W_n, H_n, C_n)$, and a size of the output feature after being processed by an upsampling layer is $(W_n \times N, H_n \times N, C_n)$, where N denotes a upsampling multiple.

In some embodiments, a cascade operation may refer to splicing obtained feature maps in a channel direction. The feature maps to be spliced may be consistent in width and height dimensions. It may be assumed that a size of the feature map to be spliced is $(W_n, H_n, C_p)$ and $(W_n, H_n, C_q)$, and an output size after the cascade operation is $(W_n, H_n, C_p+C_q)$. At least one of the first machine learning model or the second machine learning model may output multi-dimensional matrices corresponding to different images by processing images of RGB format data many times.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/ or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for detecting a signal light, comprising:

obtaining a first image and a second image previous to the first image in time sequence, wherein both the first image and the second image include a same target signal light;

determining, based on the first image, a first state of the target signal light in the first image;

determining, based on the second image and the first image, a second state of the target signal light in the first image;

wherein the determining, based on the second image and the first image, a second state of the target signal light in the first image includes:

determining the second state by processing, based on a trained second machine learning model, the second image and the first image, wherein the trained second machine learning model determines the second state based on information in a time domain of the target signal light in the first image and in the second image;

wherein the determining the second state by processing, based on the trained second machine learning model, the second image and the first image includes:

determining a state change of the target signal light from a time point when the second image is captured to a time point when the first image is captured by processing the second image and the first image based on the trained second machine learning model; and determining, based on a target state of the target signal light at the time point when the second image is captured and the state change, the second state of the target signal light in the first image, including:

obtaining a first confidence level of the first state;

obtaining, based on a confidence level corresponding to the state change, a second confidence level of the second state or an adjusted second confidence level;

wherein the obtaining, based on a confidence level corresponding to the state change, a second confidence level of the second state or an adjusted second confidence level includes:

in response to determining the state change is that a color of the target signal light does not change from the time point when the second image is captured to the time point when the first image is captured, determining a product of a confidence level of the target state corresponding to the target signal light at the time point when the second image is captured, the confidence level corresponding to the state change, and a preset second factor as the adjusted second confidence level; and in response to determining the state change is that a color of the target signal light changes from the time point when the second image is captured to the time point when the first image is captured, determining an average value of the confidence level corresponding to the state change and the confidence level of the target state corresponding to the target signal light at the time point when the second image is captured as the adjusted second confidence level; and determining, based on the first confidence level and one of the second confidence level and the adjusted second confidence level, the target state; and determining, based on the first state and the second state, the target state of the target signal light at the time point when the first image is captured.

2. The method of claim 1, wherein the determining, based on the first image, a first state of the target signal light in the first image includes:

determining, based on a trained first machine learning model, the first state by processing the first image, wherein the first machine learning model determines the first state based on position information and color information of the target signal light in the first image.

3. The method of claim 1, wherein the determining, based on the first confidence level and one of the second confidence level and the adjusted second confidence level, the target state includes:

obtaining an adjusted first confidence level corresponding to the first state by adjusting the first confidence level; and determining, based on the adjusted first confidence level and one of the second confidence level and the adjusted second confidence level, one of the first state and the second state as the target state of the target signal light at a time point when the first image is captured.

4. The method of claim 3, wherein the obtaining an adjusted first confidence level corresponding to the first state by adjusting the first confidence level includes:

determining a product of the first confidence level and a preset first factor as the adjusted first confidence level.

5. The method of claim 1, wherein the obtaining, based on a confidence level corresponding to the state change, one of a second confidence level of the second state and an adjusted second confidence level includes:

determining, based on the state change, a determination mode corresponding to one of the second confidence level and the adjusted second confidence level; and determining, based on a confidence level of a target state corresponding to the target signal light at a time point when the second image is captured, the confidence level corresponding to the state change, and the determination mode, the second confidence level or the adjusted second confidence level.

6. The method of claim 1, wherein the determining, based on the first confidence level and one of the second confidence level and the adjusted second confidence level, the target state includes:

obtaining a first position of the target signal light in the first image through a trained first machine learning model;

determining a first comparison result by comparing the first position and a reference position; the reference position including reference coordinates or a reference box of the target signal light in the first image and the second image;

determining, based on the first comparison result, whether the first confidence level needs to be corrected;

in response to determining that the first confidence needs to be corrected, correcting the first confidence level to determine an adjusted first confidence level; and determining, based on the adjusted first confidence level and one of the second confidence level and the adjusted second confidence level, the target state.

7. The method of claim 1, wherein the determining, based on the first confidence level and one of the second confidence level and the adjusted second confidence level, the target state includes:

obtaining a second position of the target signal light in the first image through the trained second machine learning model;

determining a second comparison result by comparing the second position and a reference position; the reference position including reference coordinates or a reference box of the target signal light in the first image and the second image;

determining, based on the second comparison result, whether the second confidence level needs to be corrected;

in response to determining that the second confidence needs to be corrected, correcting the second confidence level to determine a corrected second confidence level; and determining, based on the first confidence level and the corrected second confidence level, the target state.

8. The method of claim 6, further comprising:

in response to a determination that the first confidence level needs to be corrected, correcting the first confidence level based on an intersection-over-union between the first position and the reference position; or in response to a determination that the second confidence level needs to be corrected, correcting the second confidence level based on an intersection-over-union between the second position and the reference position.

9. The method of claim 6, wherein the reference position is determined by operations including:

obtaining a sample set including positions of the target signal light in a plurality of sample images captured within a preset time period, the preset time period being before a time point when the second image is captured;

obtaining, based on a clustering algorithm, a clustering result by clustering the positions of the target signal light in the plurality of sample images in the sample set; and determining, based on the clustering result, the reference position.

10. The method of claim 9, wherein the obtaining, based on a clustering algorithm, a clustering result by clustering the positions of the target signal light in the plurality of sample images in the sample set includes:

determining, based on the sample set, an initialization reference position set and a radius, the initialization reference position set including one or more initialization reference positions;

determining, based on the initialization reference position set and the radius, an updated reference position set through a means clustering algorithm;

determining whether a termination condition is satisfied; and in response to a determination that the termination condition is satisfied, obtaining the clustering result, wherein the clustering result includes the updated reference position set.

11. The method of claim 9, further comprising:

updating, based on a position of the target signal light in the first image and/or the second image, the sample set and the reference position.

12. The method of claim 1, further comprising:

performing a preprocessing operation on at least one of the first image or the second image, wherein the preprocessing operation includes at least one of:

performing color conversion on at least one of the first image or the second image; or performing region of interest (ROI) extraction on at least one of the first image or the second image, wherein the region of interest includes a light panel region where the target signal light is located.

13. The method of claim 12, wherein the region of interest is larger than the light panel region.

14. A device for detecting a signal light comprising a processor, a storage, and a communication circuit, wherein the processor is respectively coupled to the storage and the communication circuit, program data is stored in the storage, and the processor implements the method for detecting a signal light, the method including:

obtaining a first image and a second image previous to the first image in time sequence, wherein both the first image and the second image include a same target signal light;

determining, based on the first image, a first state of the target signal light in the first image;

determining, based on the second image and the first image, a second state of the target signal light in the first image;

wherein the determining, based on the second image and the first image, a second state of the target signal light in the first image includes:

determining the second state by processing, based on a trained second machine learning model, the second image and the first image, wherein the trained second machine learning model determines the second state based on information in a time domain of the target signal light in the first image and in the second image;

wherein the determining the second state by processing, based on the trained second machine learning model, the second image and the first image includes:

determining a state change of the target signal light from a time point when the second image is captured to a time point when the first image is captured by processing the second image and the first image based on the trained second machine learning model; and determining, based on a target state of the target signal light at the time point when the second image is captured and the state change, the second state of the target signal light in the first image, including;

obtaining a first confidence level of the first state;

obtaining, based on a confidence level corresponding to the state change, a second confidence level of the second state or an adjusted second confidence level; wherein the obtaining, based on a confidence level corresponding to the state change, a second confidence level of the second state or an adjusted second confidence level includes: in response to determining the state change is that a color of the target signal light does not change from the time point when the second image is captured to the time point when the first image is captured, determining a product of a confidence level of the target state corresponding to the target signal light at the time point when the second image is captured, the confidence level corresponding to the state change, and a preset second factor as the adjusted second confidence level; and in response to determining the state change is that a color of the target signal light changes from the time point when the second image is captured to the time point when the first image is captured, determining an average value of the confidence level corresponding to the state change and the confidence level of the target state corresponding to the target signal light at the time point when the second image is captured as the adjusted second confidence level; and determining, based on the first confidence level and one of the second confidence level and the adjusted second confidence level, the target state; and determining, based on the first state and the second state, the target state of the target signal light at the time point when the first image is captured.

15. A computer-readable storage medium storing computer programs, wherein the computer programs are executed by a processor to implement the method for detecting a signal light, the method including:

obtaining a first image and a second image previous to the first image in time sequence, wherein both the first image and the second image include a same target signal light;

determining, based on the first image, a first state of the target signal light in the first image;

determining, based on the second image and the first image, a second state of the target signal light in the first image;

wherein the determining, based on the second image and the first image, a second state of the target signal light in the first image includes:

determining the second state by processing, based on a trained second machine learning model, the second image and the first image, wherein the trained second machine learning model determines the second state based on information in a time domain of the target signal light in the first image and in the second image;

wherein the determining the second state by processing, based on the trained second machine learning model, the second image and the first image includes:

determining a state change of the target signal light from a time point when the second image is captured to a time point when the first image is captured by processing the second image and the first image based on the trained second machine learning model; and determining, based on a target state of the target signal light at the time point when the second image is captured and the state change, the second state of the target signal light in the first image, including;

obtaining a first confidence level of the first state;

obtaining, based on a confidence level corresponding to the state change, a second confidence level of the second state or an adjusted second confidence level; wherein the obtaining, based on a confidence level corresponding to the state change, a second confidence level of the second state or an adjusted second confidence level includes: in response to determining the state change is that a color of the target signal light does not change from the time point when the second image is captured to the time point when the first image is captured, determining a product of a confidence level of the target state corresponding to the target signal light at the time point when the second image is captured, the confidence level corresponding to the state change, and a preset second factor as the adjusted second confidence level; and in response to determining the state change is that a color of the target signal light changes from the time point when the second image is captured to the time point when the first image is captured, determining an average value of the confidence level corresponding to the state change and the confidence level of the target state corresponding to the target signal light at the time point when the second image is captured as the adjusted second confidence level; and determining, based on the first confidence level and one of the second confidence level and the adjusted second confidence level, the target state; and determining, based on the first state and the second state, the target state of the target signal light at the time point when the first image is captured.

16. The method of claim 1, wherein the obtaining, based on a confidence level corresponding to the state change, a second confidence level of the second state or an adjusted second confidence level includes:

determining a product of a confidence level of the target state corresponding to the target signal light at the time point when the second image is captured and the confidence level corresponding to the state change as the second confidence level of the second state; and obtaining the adjusted second confidence level by adjusting the second confidence level based on a preset second factor.

17. The method of claim 1, wherein the obtaining, based on a confidence level corresponding to the result of state change, a second confidence level of the second state or an adjusted second confidence level includes:

in response to determining that the target signal light is on or when the target signal light is off, determining the confidence level corresponding to the state change as the adjusted second confidence level or the second confidence level.

18. The method of claim 1, wherein the trained second machine learning model includes a plurality of structural layers, a convolutional layer, an activation layer, a pooling layer, an upsampling layer, and a cascade operation.

* * * * *